(12) United States Patent
Berens et al.

(10) Patent No.: US 7,600,172 B2
(45) Date of Patent: Oct. 6, 2009

(54) METHOD AND DEVICE FOR DECODING PACKETS OF DATA WITHIN A HYBRID ARQ SCHEME

(75) Inventors: Friedbert Berens, Genève (CH); Laurent Chalard, Prangins (CH); Stèphane Erkan Tanrikulu, Annemasse (FR); Ettore Messina, Crozet (FR)

(73) Assignee: STMicroelectronics N.V., Amsterdam (NL)

( * ) Notice: Subject to any disclaimer, the term of this patent is extended or adjusted under 35 U.S.C. 154(b) by 601 days.

(21) Appl. No.: 11/293,460

(22) Filed: Dec. 2, 2005

(65) Prior Publication Data

US 2006/0156163 A1    Jul. 13, 2006

(30) Foreign Application Priority Data

Dec. 3, 2004    (EP)    ................................. 04028736

(51) Int. Cl.
*H04L 1/18*    (2006.01)
(52) U.S. Cl. ........................ 714/751; 714/774; 714/712
(58) Field of Classification Search ................. 714/751, 714/708, 712, 774, 752, 801, 803, 807, 790, 714/800
See application file for complete search history.

(56) References Cited

U.S. PATENT DOCUMENTS

| | | | | |
|---|---|---|---|---|
| 6,314,535 | B1 * | 11/2001 | Morris et al. | ................ 714/708 |
| 6,650,949 | B1 * | 11/2003 | Fera et al. | ...................... 700/79 |
| 6,847,760 | B2 * | 1/2005 | Argon et al. | ................... 385/28 |
| 7,234,095 | B2 * | 6/2007 | Lee et al. | ..................... 714/751 |
| 7,257,746 | B2 * | 8/2007 | Schirdewahn | ............... 714/712 |
| 7,257,764 | B2 * | 8/2007 | Suzuki et al. | ............... 714/774 |

OTHER PUBLICATIONS

"A Novel ARQ Technique Using the Turbo Coding Principle", Narayanan et al, IEEE Communications Letters, IEEE Service Center, Piscataway, US, vol. 1, No. 2, Mar. 1997, pp. 49-51, XP000687091, ISSN: 1089-7798.

"A Novel Type-II Hybrid ARQ Scheme", Naroska et al., Emerging Technologies: Frontiers of Mobile and Wireless Communication, 2004. Proceedings of the IEEE 6$^{th}$ Circuits and Systems Symposium on Shangai, Cjina, May 31-Jun. 2, 2004, Piscataway, NJ, USA, IEEE, vol. 1, May 31, 2004, pp. 85-88, XP010716019, ISBN: 0-7803-7938-1.

(Continued)

*Primary Examiner*—Scott T Baderman
*Assistant Examiner*—Fritz Alphonse
(74) *Attorney, Agent, or Firm*—Lisa K. Jorgenson; Allen, Dyer, Doppelt, Milbrath & Gilchrist, P.A.

(57) ABSTRACT

A device for decoding an incident FEC encoded packet of data within an ARQ scheme. The device includes a processor or processing means for performing successive decoding processes of successive intermediate FEC code encoded packets related to the incident FEC code encoded packet. The processor or processing means includes a FEC decoder. The processor or processing means included a determination unit or determination means for determining initial decoding conditions from the FEC code decoding result concerning the preceding intermediate FEC code encoded packet and from the current intermediate FEC code encoded packet, and the FEC decoder is for performing the current FEC code decoding using the initial decoding conditions.

35 Claims, 15 Drawing Sheets

OTHER PUBLICATIONS

"Packet Combining and Doping in Concatenated Hybrid ARQ Schemes Using Iterative Decoding", Uhlemann et al., Wireless Communications and Networking, 2003. WCNC 2003. 2003 IEEE Mar. 16-20, 2003, Piscataway, NJ, USA, IEEE, vol. 2, Mar. 16, 2003, pp. 849-854, XP010639878, ISBN: 0-7803-7700-1.

"Soft Combining Hybrid ARQ Schemes Application to Reliable Communications within 3G Wireless Networks", Chiti et al., Wireless Communications and Networking, 2003. WCNC 2003. 2003 IEEE Mar. 16-20, 2003, Piscataway, NJ, USA, IEEE, vol. 3, Mar. 16, 2003, pp. 1779-1783, XP010640039.

* cited by examiner

METHOD AND DEVICE FOR DECODING PACKETS OF DATA WITHIN A HYBRID ARQ SCHEME

FIELD OF THE INVENTION

The invention relates to the decoding of encoded packets of data within a hybrid ARQ (Automatic Repeat Request) scheme, and in particular, in wireless communication systems or wireline systems.

BACKGROUND OF THE INVENTION

The channel coding part is a very important component especially in wireless communication systems like UMTS, WLAN and WPAN. An efficient method of channel coding in packet based systems such as wireless communication systems is an Automatic Repeat Request (ARQ) system. By combining pure repetition with channel coding (FEC) a more robust system called a hybrid ARQ is constructed. These hybrid ARQ (HARQ) systems are mainly used in the wireless domain.

In wireless communication systems, hybrid ARQ schemes are used to guarantee an error free transmission of data packets. In contrast to the traditional ARQ scheme where no channel coding is used, a hybrid ARQ scheme uses a FEC (Forward Error Correction) code.

Three different kinds of hybrid ARQ schemes exist. In Hybrid ARQ type I the received packets with errors are discarded and a new packet is requested. No combination is performed in the receiver. For the repeated packet a stronger code might be used.

In Hybrid ARQ type II the received packets with errors are stored and the same packet is requested again. The newly received packet is then combined in a soft way with the stored previous packet. The normal technique used here is the Chase Combining algorithm. Another hybrid ARQ type II technique is the incremental redundancy technique.

In some publications the incremental redundancy scheme is called hybrid ARQ type III. Here the additional packet contains additional information. This additional information is combined with the stored packet. The new combined packet is then processed by the channel decoder.

Different types of channel coding can be used. In wireless communications, convolutional codes, turbo-codes and Low Density Parity Check (LDPC) codes are examples of codes which can be used as a FEC code.

Especially in the case of hybrid ARQ type II and type III, the main challenge in the receiver is the management of the needed memory to store the soft values for the combination process. In the traditional approach, the soft values are combined before the deployment of the channel decoder. Thus the previously received packet (soft values) needs to be stored until the repeated packet arrives. After the reception of the new packet, the stored packet and the new packet need to be combined. The combined packet is then processed by the channel decoder.

SUMMARY OF THE INVENTION

An object of the invention is to perform the combination between the data of the previous packet and the data of the current packet.

Another object of the invention, in particular when a turbo-code is used as a FEC code, is to simplify the implementation of the overall outer modem including the decoder.

Another object of the invention, in particular when a turbo-code is used as a FEC code, is to improve the decoding precision.

The invention may provide a method of decoding an incident FEC code encoded packet of data within an ARQ scheme. The method may comprise successive decoding processes of successive intermediate FEC code encoded packets related to the incident FEC code encoded packet. Each decoding process may include a FEC code decoding.

In addition, the invention may provide a current decoding process comprising determining initial decoding conditions from the FEC code decoding results concerning the preceding intermediate FEC code encoded packet and from the current intermediate FEC code encoded packet. The invention may also provide for performing the current FEC code decoding using the initial decoding conditions.

In other words, the inventors have observed that using the code decoding results of the preceding FEC code decoding (i.e. the decoding of the previously received packet) for elaborating the initial decoding conditions of the current decoding process (i.e. the decoding process concerning the current received packet) facilitates the combination of the information contained in the previous packet with the information contained in the current received packet. Thus, with such an embodiment of the invention, in particular when a turbo-code is used as a FEC code, it may be possible to replace the soft combining unit of the prior art that is implemented outside the FEC decoder with an internal shadow memory. Consequently, the overall outer modem design and implementation may be simplified. And, as it will be explained in more detail later, the shadow memory may advantageously be the feedback interleaver memory of the turbo-code decoder.

Of course for the first FEC code decoding, no preceding decoding results may have been calculated. But in such a case, the preceding decoding results may be set to neutral values, for example "0" logic values, such that the initial decoding conditions of the first FEC code decoding may be obtained from the first intermediate FEC code encoded packet.

The invention may be applicable to a hybrid ARQ system of type II, or to a hybrid ARQ system of type III, i.e. an hybrid ARQ system with incremental redundancy technique. More precisely, for a hybrid ARQ system with incremental redundancy, a current intermediate FEC code encoded packet may comprise a received encoded group of data resulting from the transmission of a punctured FEC code encoded packet obtained from a puncturing of the incident FEC code encoded data with a current puncturing mask. And the current intermediate FEC code encoded packet may comprise additional reference data, in general neutral values, for example zero logic values, which replace the punctured bits. If the current intermediate encoded packet is not correctly decoded, a negative acknowledgement (NACK) may be emitted causing the reception of another encoded group of data originating from the puncturing of the incident encoded packet, but with another puncturing mask different from the current puncturing mask.

When a hybrid ARQ system of type II is used, each intermediate FEC code encoded packet may be a received packet resulting from the transmission of at least a part of the incident FEC code encoded packet. In other words, the incident FEC code encoded packet may be punctured or not. But, if the incident packet is punctured with a puncturing mask, the same puncturing mask may be used for all the next eventual transmissions caused by the reception of a negative acknowledgement (NACK).

Although the invention may be used with any type of FEC code decoding, an example of FEC code-decoding may comprise a Soft-In-Soft-Out (SISO) decoding process. In such a case, each FEC code decoding result may comprise soft output values.

According to an embodiment of the invention, the incident FEC code encoded packet may be an incident turbo-code encoded packet and each FEC code decoding may comprise a turbo-code decoding process.

According to an embodiment of the invention, each turbo-code decoding process may comprise an iterative soft-in-soft-out decoding process for delivering Log-Likelihood-Ratios called LLRs. Thus, the initial decoding conditions may comprise the data of the current intermediate FEC code encoded packet and the previous LLRs delivered at the end of the turbo-code decoding process concerning the preceding intermediate FEC code encoded packet.

When, for example, the iterative soft-in-soft-out decoding process comprises two decoding processes of the Maximum-A Posteriori (MAP) type, the data of the current intermediate FEC code encoded packet may comprise systematic values, first parity values and second parity values. The initial decoding conditions may therefore comprise first data delivered to the first MAP decoding process, the first data including the systematic values, the first parity values and the previous LLRs. The initial decoding conditions may also comprise second data delivered to the second MAP decoding process with the second data including the second parity values.

According to a preferred embodiment that may improve the decoding precision, the Turbo-code decoding result concerning the preceding intermediate Turbo-code encoded packet is further taken into account at each iteration of the current iterative Turbo-code decoding process. For example, the previous LLRs are delivered to the first MAP decoding process at each iteration of current iterative Turbo-code decoding process.

According to another embodiment of the invention, the incident FEC code encoded packet may be an incident Low Density Parity Check (LDPC) code encoded packet and each FEC code decoding may comprise a LDPC code decoding process. The decoding precision of the LDPC decoding process according to the invention may be improved.

According to an embodiment of the invention, the LDPC code decoding process may comprise iterative exchanges of values (messages) between check nodes including a processing unit and a first storage or first storing means, and variable nodes including another processing unit and a second storage or second storing means. The first storage or first storing means may contain the decoding result of the LDPC code decoding process. In such an embodiment, the determining step of the initial decoding conditions may comprise combining within the variable nodes the data of the current intermediate LDPC code encoded packet with the decoding result concerning the preceding intermediate LDPC encoded packet and contained in the first storage or first storing means. The determining step of the initial decoding conditions may also comprise storing the initial decoding conditions in the second storage or second storing means of the variable means.

The combination of the data of the current intermediate LDPC code encoded packet with the decoding result concerning the preceding intermediate LDPC code encoded packet may comprise, for example, a summation or a weighted summation.

According to another aspect of the invention, it is also proposed a device for decoding an incident FEC encoded packet of data within an ARQ scheme. The device may comprise a processor or processing means for performing successive decoding processes of successive intermediate FEC code encoded packets related to the incident FEC code encoded packet. The processor or processing means may include a FEC decoder. The processor or processing means may further comprise a determination unit or determination means for determining initial decoding conditions from the FEC code decoding result concerning the preceding intermediate FEC code encoded packet and from the current intermediate FEC code encoded packet. And the FEC decoder may be adapted to perform the current FEC code decoding using the initial decoding conditions.

According to an embodiment of the invention, the FEC decoder may comprise a Soft-In-Soft-Out decoder for delivering the decoding result comprising soft output values. According to an embodiment of the invention, the incident FEC code encoded packet may be an incident Turbo code encoded packet and the FEC decoder comprises a Turbo code decoder.

According to an embodiment of the invention, the Turbo code decoder may be adapted to perform an iterative Soft-In-Soft-Out decoding process for delivering Log-Likelihood-Ratios called LLRs. The initial decoding conditions may comprise the data of the current intermediate FEC code encoded packet and the previous LLRs delivered by the Turbo code decoder at the end of the Turbo code decoding process concerning the preceding intermediate FEC code encoded packet.

According to an embodiment of the invention, the Turbo code decoder may comprise at least one MAP decoder for implementing two decoding processes of the Maximum-A-Posteriori (MAP) type. The data of the current intermediate FEC code encoded packet may comprise systematic values, first parity values, and second parity values. The initial decoding conditions may comprise first data delivered to the first MAP decoding process, the first data including the systematic values, the first parity values, and the previous LLRs. The initial decoding conditions may also comprise second data delivered to the second MAP decoding process, the second data including the second parity values.

According to an embodiment of the invention, the Turbo code decoder may comprise a main deinterleaving memory adapted to store and deinterleave extrinsic information delivered by the second MAP decoding process, and an auxiliary deinterleaving memory (shadow memory) for storing and deinterleaving the previous LLRs. The Turbo code decoder may also comprise a first switch for delivering either the extrinsic information to the main deinterleaving memory or the previous LLRs to the auxiliary deinterleaving memory, a second switch for delivering either the deinterleaved extrinsic information or the deinterleaved previous LLRs to the first MAP decoding process, and a controller or control means for controlling the first and second switches.

According to an embodiment which improves the decoding precision, the Turbo code decoder may comprise a main deinterleaving memory for storing and deinterleaving extrinsic information delivered by the second MAP decoding process, the output of the main deinterleaving memory being connected to the a priori input of the first MAP decoding process. The Turbo code decoder may also comprise an auxiliary deinterleaving memory for storing and deinterleaving the previous LLRs, the output of the auxiliary deinterleaving memory being connected to a fourth input of the first MAP decoding process. The Turbo code decoder may further comprise a first switch for delivering either the extrinsic information to the main deinterleaving memory or the previous LLRs to the auxiliary deinterleaving memory, and a controller or control means for controlling the first switch.

According to an embodiment of the invention more particularly directed to several independent ARQ processes, the Turbo code decoder may comprise several auxiliary deinterleaving memories respectively adapted to store several previous LLRs respectively associated to several different independent ARQ schemes.

According to another embodiment of the invention, the incident FEC code encoded packet may be an incident LDPC code encoded packet and the FEC decoder may comprise an LDPC decoder or LDPC decoding means. According to another embodiment of the invention, the LDPC decoder or LDPC decoding means may comprise check nodes including a processing unit and a first storage or first storing means, and variable nodes including a processing unit and a second storage or second storing means. The first storage or first storing means of the check nodes are for containing the decoding result of the LDPC decoding process. The determination unit or determination means may comprise a combination unit or combination means included in the variable nodes for combining the data of the current intermediate LDPC encoded packet with the decoding result concerning the preceding intermediate LDPC encoded packet, and storing the initial decoding conditions in then second storage or second storing means of the variable nodes. The combination unit or combination means may comprise a summation unit or summation means, for example.

According to another aspect of the invention, it is also proposed a hybrid ARQ system may comprise a device such as the one defined above. It is also proposed that an element of a wireless communication system, for example a mobile radio system or a system of the WLAN or of WPAN type, may comprise a device of the type defined above. Such an element may form a cellular mobile phone.

It is also proposed an element of a wireline communication system, for example an ADSL, VDSL, or XDSL system, may comprise a device of the type defined above. Such an element may form a wireline modem.

BRIEF DESCRIPTION OF THE DRAWINGS

Other advantages and features of the invention will appear on examining the detailed description of embodiments, these being in no way limiting and of the appended drawings in which.

DETAILED DESCRIPTION OF THE PREFERRED EMBODIMENTS

Traditional ARQ systems are simple, easy to implement and provide high system reliability, but they suffer from a rapid decrease in throughput with increased channel error rates. In fact, the increased frequency of retransmission requests has a severe impact on the throughput.

Forward error correction (FEC) systems maintain constant throughput (equal to the code rate R) regardless of the channel error rates. However, FEC systems have two major drawbacks.

First, when a received sequence is detected in error, the sequence has to be decoded and the decoder output has to be delivered to the user regardless of whether it is correct or incorrect. Since the probability of a decoding error is usually greater than the probability of an undetected error, FEC systems are not highly reliable. Second, in order to achieve high system reliability, long powerful codes must be used, which can correct a large number of error patterns.

The benefits of ARQ systems of obtaining high reliability can be coupled with the advantage of FEC systems to provide constant throughput even with poor channel conditions. Such system, which is a combination of two basic error control schemes FEC and ARQ, is referred to as Hybrid ARQ (HARQ) scheme.

Figure 1:
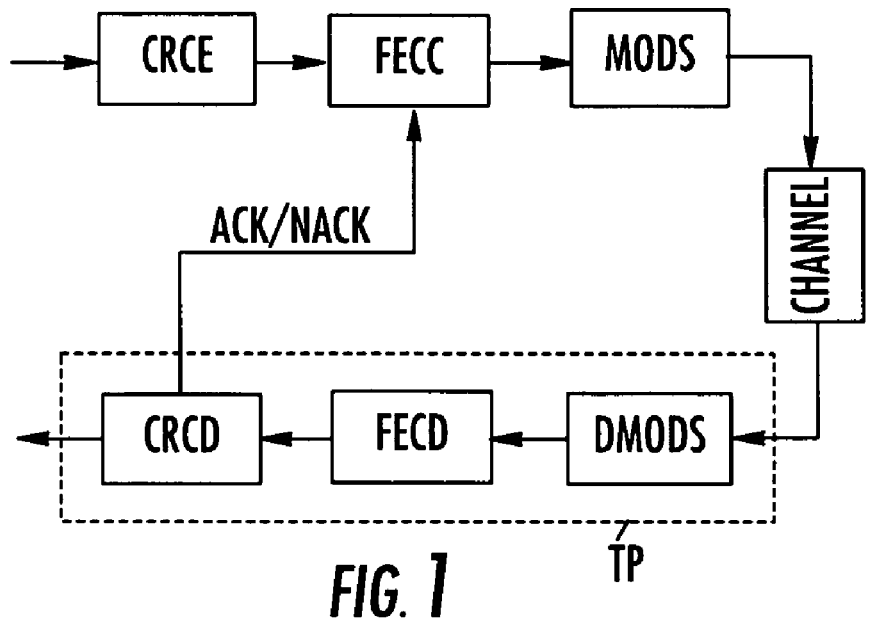
FIG. 1 illustrates diagrammatically a first embodiment of a device according to the invention.

Such a hybrid ARQ system is illustrated in FIG. 1. More precisely, the transmitter side, which can be for example a base station in an UMTS wireless communication system, comprises a CRC (Cyclic Redundancy Check) encoder CRCE followed by a forward error correction (FEC) code encoder FECC. A module MODS, connected to the output of the encoder FECC, is adapted for performing a modulation as well as a spreading.

The encoded packet of data is then transmitted on a channel towards a receiver TP, which can be for example a cellular mobile phone. The modem of the receiver comprises for example a processor or processing means including a module DMODS adapted to perform a demodulation as well as despreading of the information received from the channel.

The module DMODS is followed by a FEC code decoder FECD. The output of the FEC decoder is connected to a CRC code decoder CRCD.

As illustrated in FIG. 1, the CRC decoder CRCD is adapted to send an acknowledgment ACK or a negative acknowledgment NACK depending on the success of the decoding process of the received packet. More precisely, the binary information bits are encoded with a cyclic redundancy check (CRC) code for error detection. These encoded binary information bits are then channel-encoded with a forward error correction (FEC) code with coding rate R. After having received the packet, the receiver checks the quality of the received packet after FEC decoding. If some errors are detected, a negative acknowledgment NACK is sent back to the transmitter.

If a hybrid ARQ system of type II is implemented, this NACK requires retransmission of the same encoded packet. However, if a hybrid ARQ system of type III (i.e. with incremental redundancy) is implemented, the retransmitted packets are not identical to the original transmission packet. The retransmitted packet carries additional redundancy information, i.e. parity bits for error correction.

In the prior art, in a hybrid ARQ type II system, the soft decision data sequence of the erroneous packet is stored in a buffer at the receiver side and it is combined symbol by symbol with the retransmitted packet before FEC decoding. In a hybrid ARQ system with incremental redundancy, the additional redundancy is combined with the previously received packet and the resulting more powerful FEC code word with coding rate R is decoded.

In particular, when the FEC code is a turbo-code, the basic structure of a receiver according to the prior art is extended, in order to perform a hybrid ARQ process, by adding a combination unit and a memory buffer before the FEC decoder. The combination unit performs the combination of the stored packets and the newly received additional data packet in the case of a retransmission.

The invention proposes a solution which is totally different from that used in the prior art, for performing the decoding of an incident encoded packet within an ARQ scheme. The main steps of an embodiment of a method according to the invention are now described with reference to FIG. 2. These steps are applicable whatever the type of FEC code used.

We assume first that the HARQ system is of type III, i.e. with incremental redundancy. The incident FEC code encoded packet to be decoded is punctured (step 20) by using a puncturing mask. Then, after some conventional processes such as modulation, the punctured encoded packet is transmitted (step 21).

After reception and demodulation, an intermediate FEC code encoded packet is elaborated (step 23) from the encoded received packet and from additional reference data, generally neutral logic values, for example "0" logic values. In other words, the punctured bits are replaced by "0" values. Then initial decoding conditions are determined (step 24) from the content of the intermediate encoded packet and from the decoding result of the FEC decoding of the preceding intermediate encoded packet.

However, for the first transmission of a punctured packet, no preceding decoding result is available. Thus "the preceding decoding result" is replaced by neutral logic values, for example "0" logic values, so that the initial decoding conditions are determined from the content of the first intermediate encoded packet.

Then the FEC code decoding is performed (step 25) using the initial decoding conditions. The decoding result is then analyzed (step 28). If it is OK, i.e. if the incident encoded packet has been considered to be correctly decoded, an ACK is transmitted (step 27), and another incident encoded packet can eventually be processed.

But, if the incident encoded packet has been considered to be incorrectly decoded, a NACK is transmitted (step 26) and another punctured packet is obtained from another puncturing mask, which is different from the preceding puncturing mask, and this new punctured packet is further processed as explained for the preceding punctured packet.

Figure 2:
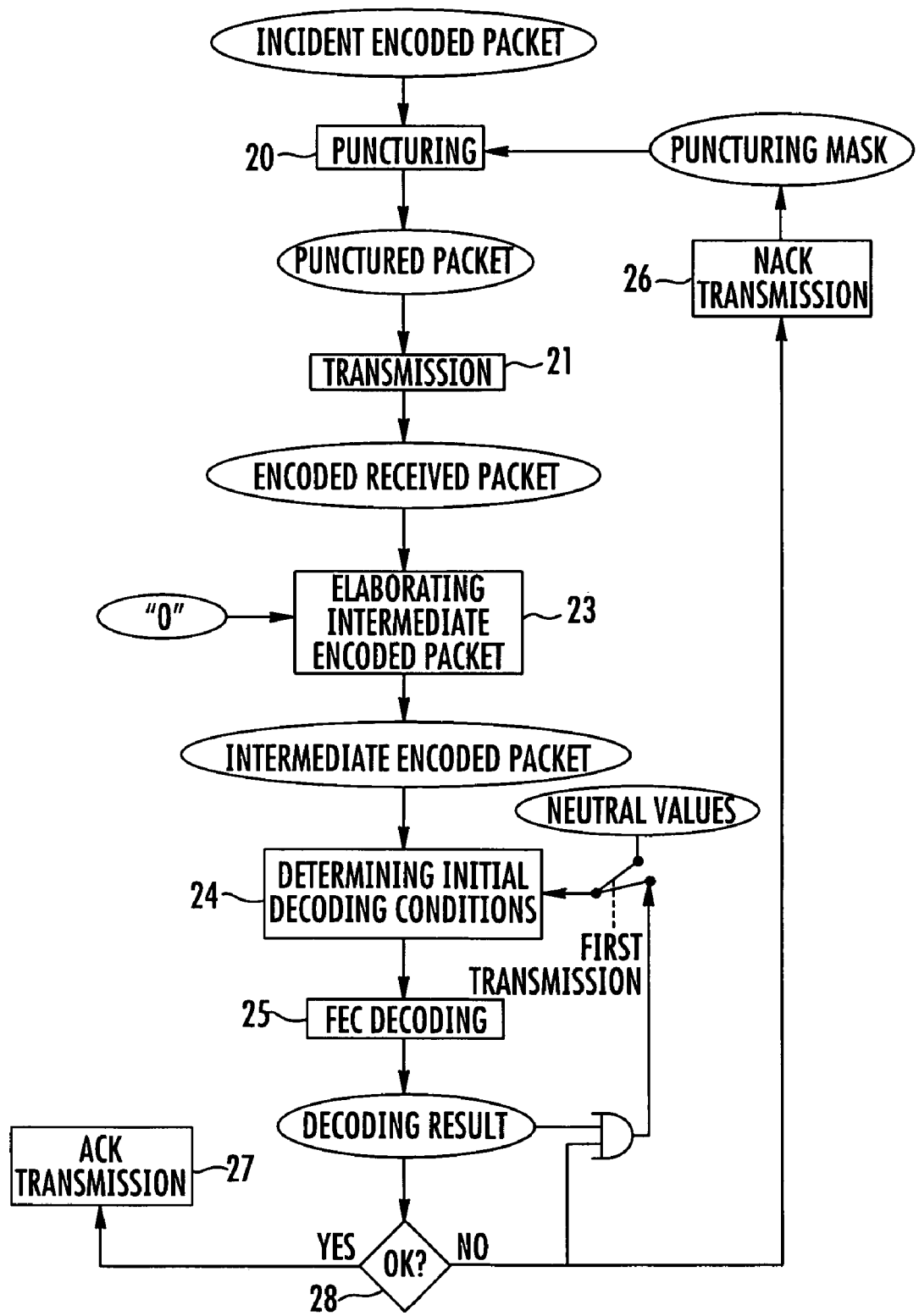
FIG. 2 illustrates the main steps of an embodiment of a method according to the invention.

If the used HARQ system is of type II, i.e. without incremental redundancy, the flow chart of FIG. 2 is also applicable. However, the puncturing step 20 is optional. Further, in the presence of a NACK (step 26), the same packet is retransmitted. That means in particular that the same puncturing mask, if any, is used for all the transmission related to the incident encoded packet to be decoded. Of course, for another incident encoded packet to be decoded, the puncturing mask, if any, may be different or not.

Figure 3:
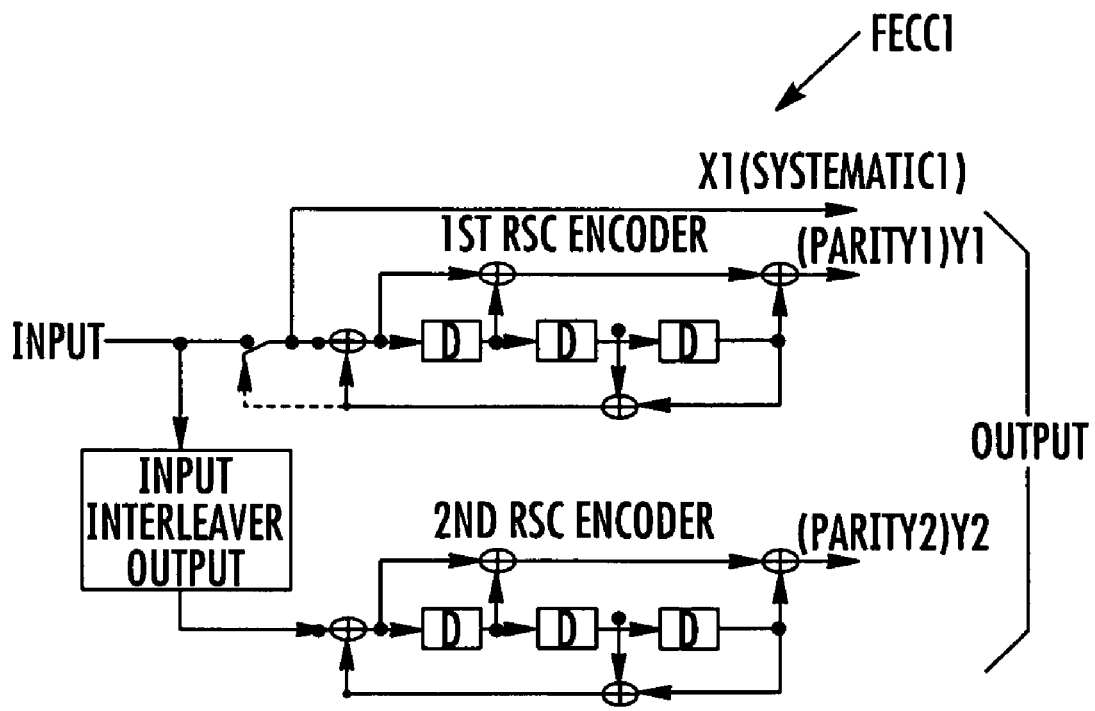
FIG. 3 shows an example of a turbo-code encoder as in the prior art.

A first example of a decoding method according to the invention will be now described when a turbo-code is used as a FEC code. A turbo-code encoder is known per se. An example thereof is referenced FECC1 and diagrammatically illustrated in FIG. 3.

The turbo-code encoder FECC1 here is a UMTS turbo-code encoder. It consists of two constituent convolutional encoders and an interleaver. The convolutional codes are fixed to be RSC (Recursive Codes) codes. Each RSC encoder has three storage elements (K=4, 8 states) and generates the output streams parity 1 ($y_1$) and parity 2 ($y_2$). Further, an internal interleaver is connected between the two RSC encoders.

In addition, the systematic bits ($x_1$) are available at the output of the encoder FECC1. The resulting code rate is R=⅓. Generally speaking, depending on the type of decoding that is used, hard values or soft values can be relevant.

Hard values may indicate if a symbol is supposed to be "1" or "0". Soft values also deliver a measure for the reliability of the decision (the hard decision is extended by the probability that the decision is correct).

For Turbo decoding only soft-in values are relevant. Based on the channel values, probabilities can be computed that certain combinations of systematic and parity bit occurred. From this and considering the encoder history, the probability that the encoder was in a given state at a given time-step can be computed.

Several algorithms may be implemented in a turbo-code decoder. Suitable algorithms are the MAP algorithm and the SOVA (Soft Output Viterbi Algorithm).

The SOVA is usually implemented as a two-step algorithm, with a Viterbi algorithm part and a part responsible for calculating the soft-outputs. The state metric unit of the part realizing the Viterbi can be implemented based on a traceback or a register-exchange structure. The soft-output calculation part consists mainly of a competing path computation unit.

However, especially for a wild range of throughput requirements, a more efficient implementation is obtained with a so-called MAP (Maximum-A-Posteriori) algorithm, or with its sub-optimum version that is called Max Log MAP algorithm.

A conventional turbo-code decoder architecture, implementing MAP algorithm, comprises a serial to parallel converter, which converts the soft value stream coming from the receiver into three parallel streams of systematic values ($x_1$), parity values 1 ($y_1$) and the interleaved parity values 2 ($y_2$) The decoding process is performed by two MAP decoders ($MAP_1$ and $MAP_2$). The two MAP decoders are connected by an interleaver ($Interleaver_1$) and a deinterleaver ($Deinterleaver_1$). Another deinterleaver performs the deinterleaving of the output values resulting in the data stream $X_{est}$.

In the iterative decoding process the extrinsic values $\Lambda_{2,int}$ generated in the first step are feedback to the next iteration using $deinterleaver_1$. At the initial iteration the input values from $deinterleaver_1$ to $MAP_1$ decoder are set to 0, which represents the neutral value of the intrinsic information. In the successive iterations, the calculated extrinsic information is used at the a priori input of $MAP_1$. The principle of the turbo-decoding as well as the structure of such conventional turbo-code decoders implementing MAP or Max Log MAP algorithms, are well known by those of skilled in the art, for example, from EP 1 398 881.

Figure 4:
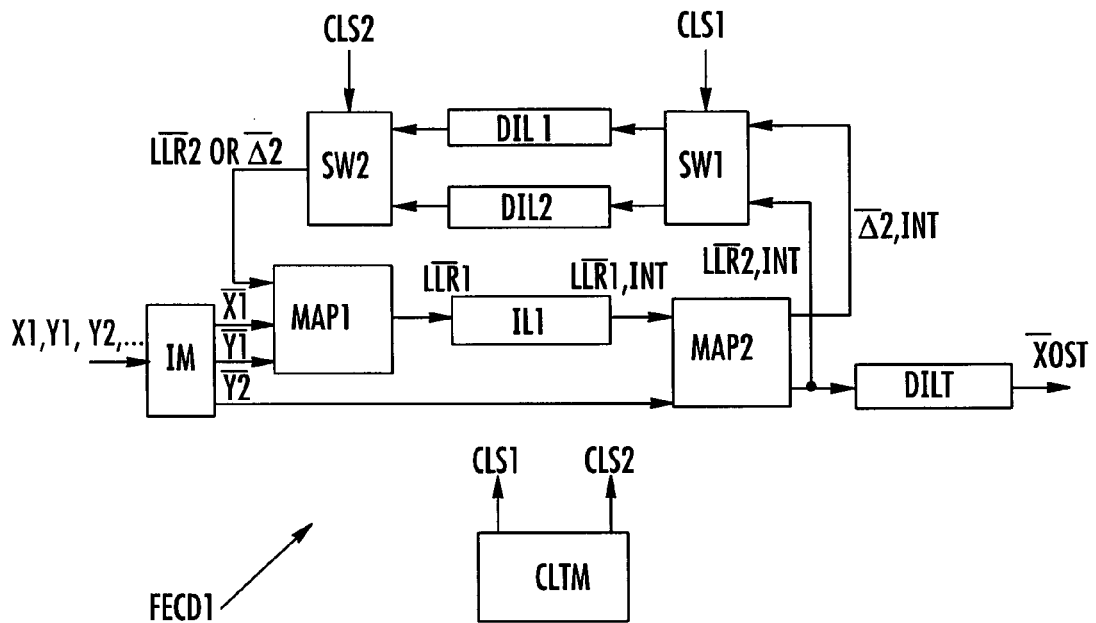
FIG. 4 illustrates diagrammatically a first embodiment of a turbo-code decoder according to the invention.
Figure 5:
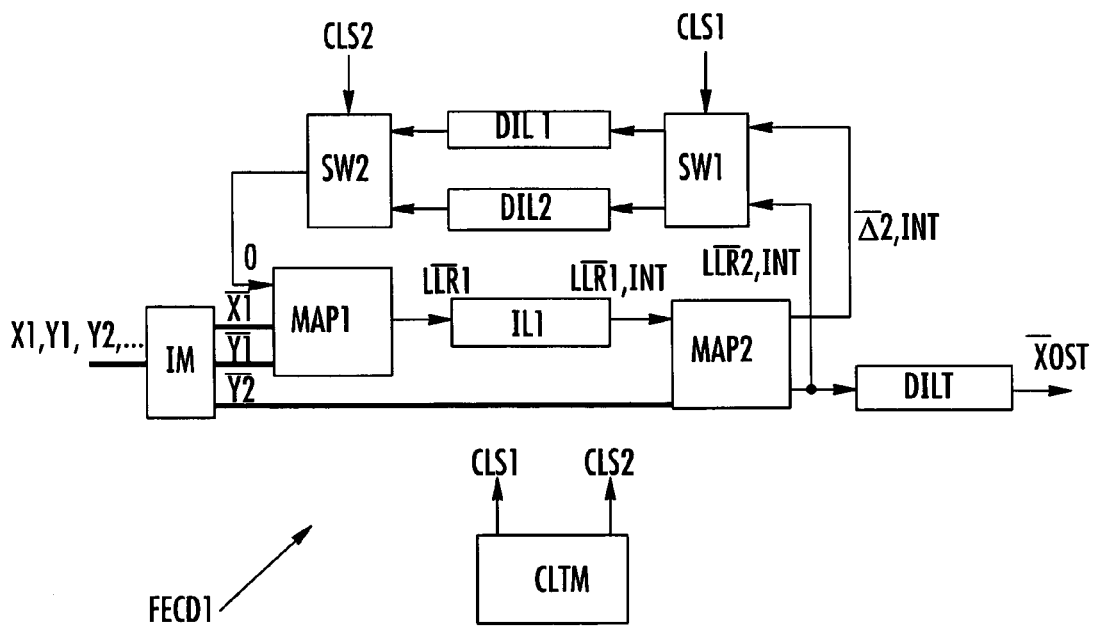
FIGS. 5-10 illustrate an example of a decoding method according to the invention, applicable to a turbo-code decoding, in accordance with the invention.

According to an embodiment of the invention, it is proposed to re-use the internal deinterleaving memory for the implementation of the ARQ buffer memory. More precisely, such an embodiment of a turbo-code decoder FECD1 according to the invention is depicted in FIG. 4.

The decoder FECD1 comprises an input buffering module IM for performing in particular a serial to parallel conversion which converts the soft values stream coming from the channel into three parallel streams of systematic values $x_1$, first parity value $y_1$, and the interleaved second parity value $y_2$. The decoding process is performed by two MAP decoders $MAP_1$ and $MAP_2$. Although two separate MAP units can be used, an alternative embodiment would only use one MAP unit. In such a case, the $MAP_1$ and $MAP_2$ operation are done serially on the same MAP unit.

The two MAP decoders are connected by an interleaver IL1. An output deinterleaver DILT performs the deinterleaving of the output values resulting in the data stream $x_{est}$.

Decoding Turbo codes by searching the most likely codeword is far too complex, and therefore iterative decoding is advised. The two convolutional codes are decoded separately. While doing this, each decoder incorporates information that has been gathered by the other. This "gathering of information" is the exchange of soft-output values, where the bit-estimates of one unit are transformed into a priori information for the next. The decoders hence have to be soft-input soft-output (SISO) units, for example MAP units.

The confidence in the bit estimation is represented as a Log-Likelihood-Ratio (LLR):

$$LLR(d_k) = \text{Log}(P(d_k=1)/P(d_k=0))$$

The sign shows whether this bit is supposed to be one or zero whereas the confidence in the decision is represented by the magnitude.

The $MAP_2$ unit has a LLR output which delivers the interleaved LLRs, referenced $LLR_{2,int}$. The MAP2 unit also has an extrinsic output that delivers the interleaved extrinsic values called $\Lambda_{2,int}$.

A main deinterleaving memory DIL1 is connected between the extrinsic output of the $MAP_2$ unit and the a priori input of the $MAP_1$ unit, through two switches SW1 and SW2.

Further, an auxiliary deinterleaving memory DIL2 is connected between the LLR output of the $MAP_2$ unit and the a priori input of the $MAP_1$ unit through the switches SW1 and SW2. Those switches SW1 and SW2 are respectively controlled by control signals CLS1 and CLS2 generated by controller or control means CLTM, which can be realized for example by software.

As it will be explained in more detail hereafter, the main deinterleaving memory is adapted to store and deinterleave the extrinsic information $\Lambda_{2,int}$ delivered by the second MAP decoding process whereas the auxiliary deinterleaving memory DIL2 is adapted to store and deinterleave the previous LLRs (called $LLR_{2,int}$), resulting from the decoding of a previously received packet. And, the second switch SW2 is adapted for delivering either the deinterleaved extrinsic information or the deinterleaved previous LLRs to the first MAP decoding process $MAP_1$.

Of course, although two different deinterleaving memories DIL1, DIL2 have been depicted in FIG. 4, a unique memory can be used with different memory areas respectively allocated to the extrinsic information and the LLR information. In other words, the deinterleaving memory can be split into an active (here, deinterleaver DIL1), which is being used in the actual turbo-decoding iteration, and a shadow memory (here, DIL2). In the active memory, the extrinsic information is processed. The shadow memory stores the LLR values obtained from the last turbo-code decoding iteration.

We refer now more specifically to FIGS. 5 through 10 for describing the main steps of an example of decoding method according to the invention. An incident turbo-code encoded packet of data, which comprises systematic value $x_1$, first parity value $y_1$ and second parity value $y_2$, is to be decoded.

In FIG. 4, $x_1$, $y_1$ and $y_2$ represent respectively the systematic values, the first parity values, and the second parity values of the first intermediate turbo-code encoded packet. For turbo-decoding the first encoded intermediate packet, the initial conditions are constituted by the systematic values $x_1$, the first and second parity values $y_1$ and $y_2$, as well as the values "0" (FIG. 5) which represent the neutral values of the extrinsic information. As a matter of fact, at the initial iteration, the input values from deinterleaver DIL1 to the $MAP_1$ unit are set to 0.

Figure 6:
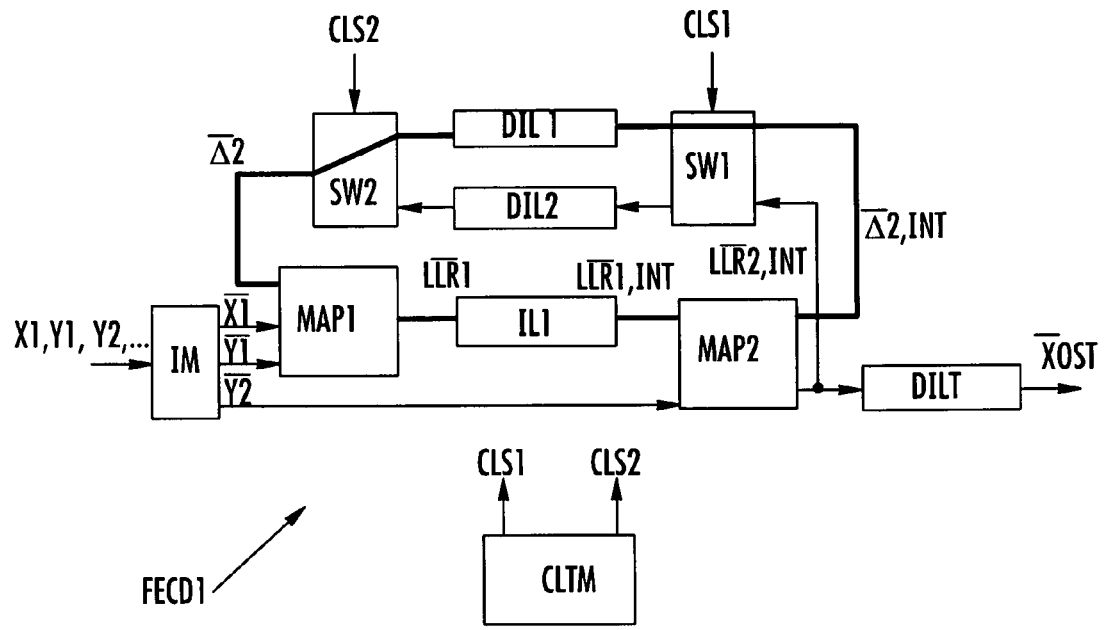

In the successive iterations of the turbo-decoding, the calculated extrinsic information $\Lambda_2$ is used at the input of the $MAP_1$ unit (FIG. 6). During these iterations, the switches SW1 and SW2 are positioned so that the deinterleaving memory DIL1 is connected between the extrinsic output of the $MAP_2$ unit and the a priori input of the $MAP_1$ unit.

As it is well known by the man skilled in the art, $\gamma$ metrics are calculated by the MAP1 unit. Such metrics are for example given by the following formulas (1):

$$\gamma 0 = 0$$
$$\gamma 1 = y_1$$
$$\gamma 2 = d$$
$$\gamma 3 = d + y_1 \quad (1)$$

d is given by formula (2):

$$d = x_1 + \Lambda_2 \quad (2)$$

Figure 7:
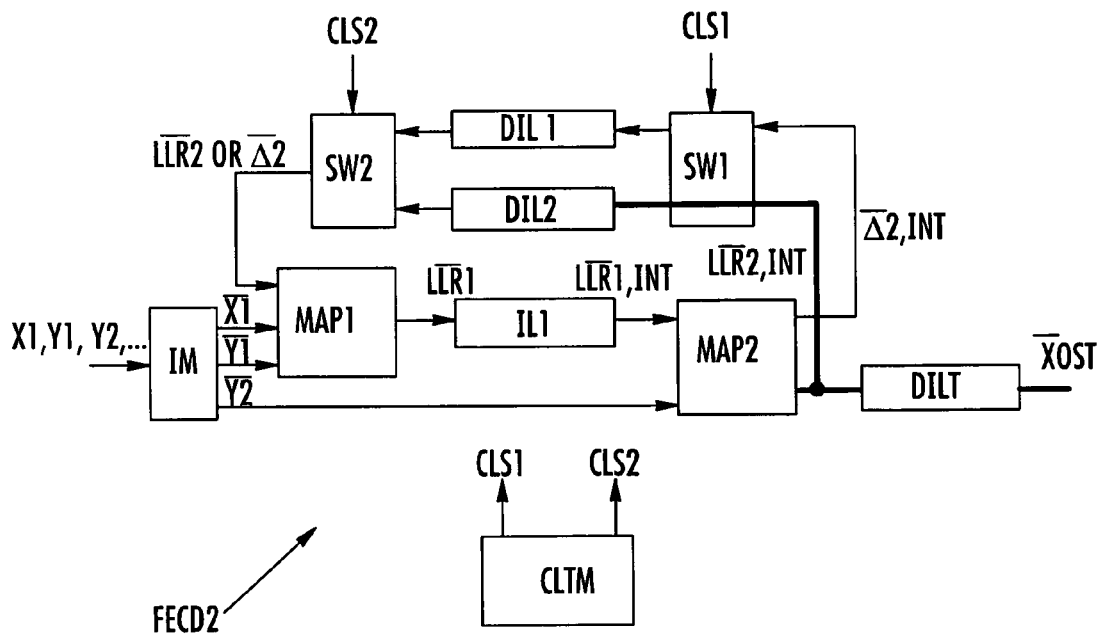

At the end of the last turbo decoding iteration, the LLR values $LLR_{2,int}$ are delivered to the output deinterleaver DILT for obtaining the output data stream $x_{est}$. Further, the controller or control means CLTM send the control signal CLS1 so that these LLR values are also stored in the shadow memory DIL2 (FIG. 7).

If the received first intermediate encoded packet has not been considered as correctly decoded, a negative acknowledgment is sent to the transmitter by the receiver and the transmitter will send additional symbols to increase the coding performance. This might be a complete packet or incremental information segments, depending on the used ARQ scheme. In a conventional ARQ receiver, this additional information would be combined with the existing information in a combining unit located outside of the decoder, and then delivered into the decoder. The decoder would then start a new round of decoding iterations.

According to the described embodiment of the invention, this combination will be performed by the decoder FECD1 by using the stored LLR values related to the preceding packet reception, i.e. the LLR values stored in the shadow memory DIL2 related to the decoding of the first intermediate packet.

Figure 8:
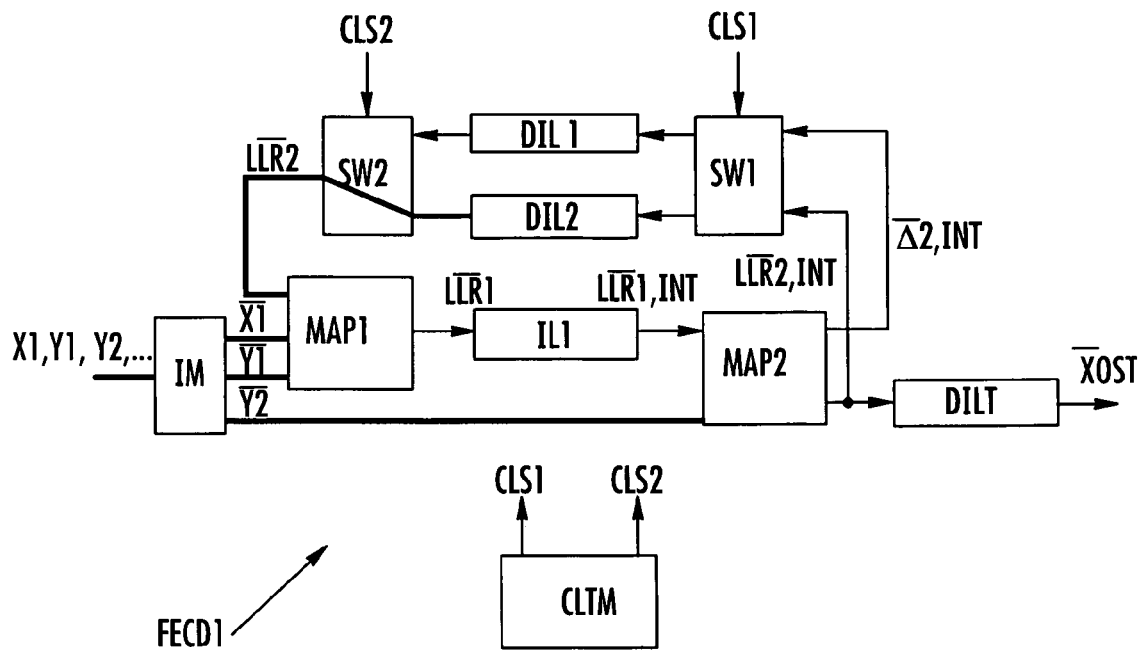

More precisely, as illustrated in FIG. 8, assuming the first intermediate packet has not been correctly decoded, a second intermediate encoded packet is elaborated as described above for the first intermediate packet. In FIG. 8, $x_1$, $y_1$ and $y_2$ represent respectively the systematic values, the first parity values, and the second parity values of the second intermediate encoded packet.

For the turbo decoding of this second intermediate encoded packet, the initial conditions are constituted by the values $x_1$, $y_1$, and $y_2$ as well as by the LLR values $LLR_2$ stored in the shadow memory DIL2 and related to the decoding of the first intermediate packet. These values $LLR_2$ are delivered by the switch SW2 controlled by the control signal CLS2 to the a priori input of the $MAP_1$ unit.

Figure 9:
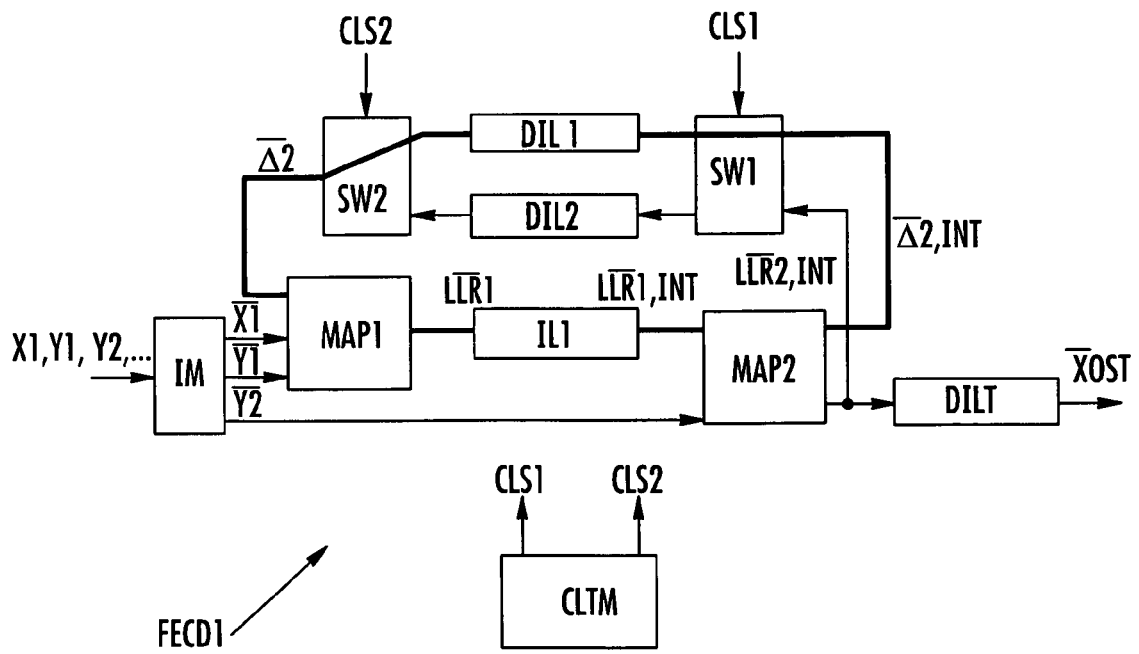
Figure 10:
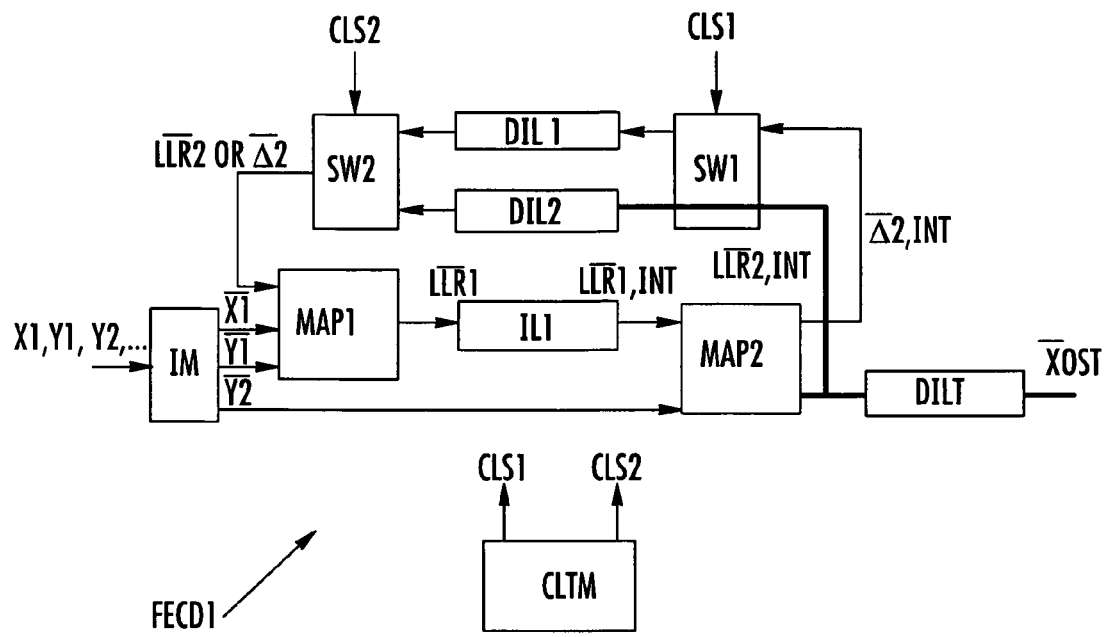

The second intermediate packet is then turbo decoded as for the first intermediate packet (FIG. 9). At the end of the last turbo decoding iteration, the LLR values (decoding results of the second intermediate packet) are stored in the shadow memory DIL2 in the eventuality of another ARQ iteration if the second intermediate packet has not been correctly decoded (FIG. 10).

Thus, the method and device according to this embodiment of the invention replaces the soft combining unit according to the prior art that is located outside the decoder, with an internal shadow memory. Accordingly, the overall outer modem design and implementation is simplified. The shadow memory may be in fact a feedback interleaver memory of the turbo-code decoder.

Figure 11:
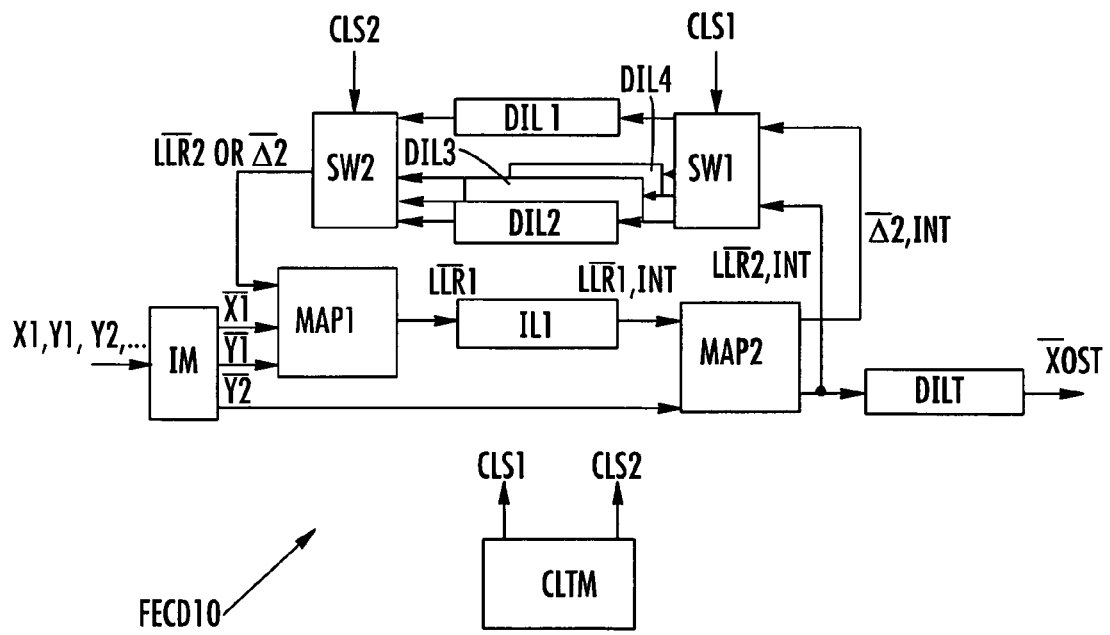
FIG. 11 illustrates diagrammatically another embodiment of a turbo-code decoder according to the invention.

Such an architecture can be extended in the case of several independent ARQ processes respectively associated to different users, for example. As depicted in FIG. 11, for the case of three independent ARQ processes, the turbo-code decoder FECD10 comprises three independent deinterleaver LLR memories DIL2, DIL3 and DIL4, and one deinterleaver memory DIL1 for one extrinsic information.

Figure 12:
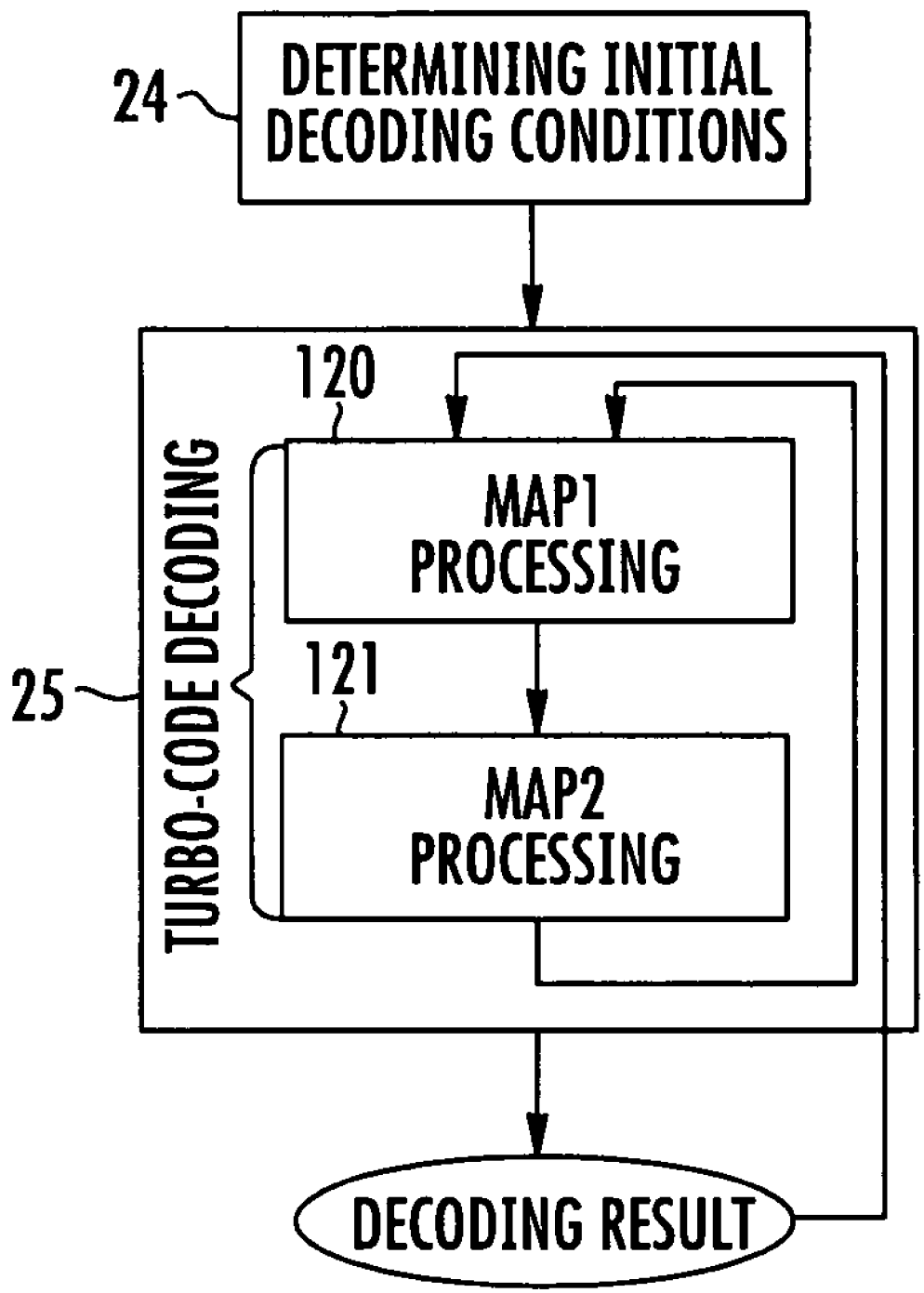
FIG. 12 illustrates diagrammatically another example of turbo-code decoding according to the invention.

Another embodiment of the invention, also applicable for a Turbo-code decoding, will be now described more particularly with reference to FIG. 12 through 19. According to this embodiment, as illustrated in FIG. 12, not only the preceding decoding result is used for determining the initial decoding conditions, but the preceding decoding result is also used as an input for the MAP1 processing 120 during all the iterations of the turbo-code decoding process 25 between the MAP2 processing and the MAP1 processing. The precision decoding is thus improved.

Figure 13:
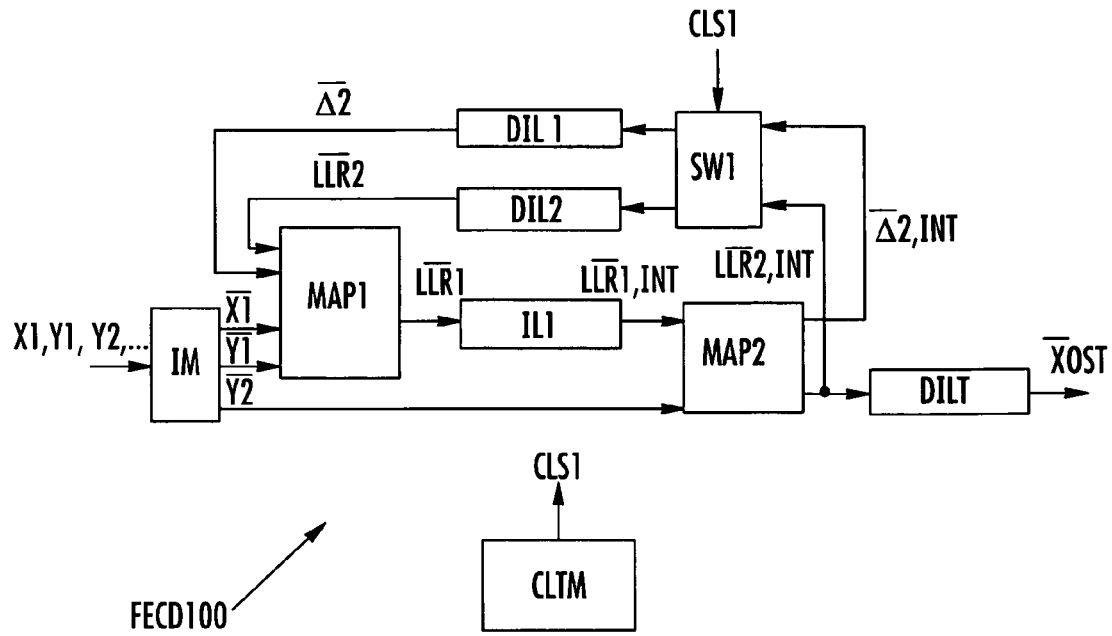
FIG. 13 illustrates diagrammatically another embodiment of a turbo-code decoder according to the invention.

An example of such a turbo-code decoder FECD100 is illustrated in FIG. 13. The MAP1 unit here comprises four inputs instead of three as for the MAP1 unit of the turbo-code decoder FECD1 of FIG. 4. One input receives the systematic values. Another input receives the first parity values. Another input is connected to the output of the deinterleaving memory DIL1 for receiving the extrinsic values. The fourth input is connected to the output of the deinterleaving memory DIL2 for receiving the LLR2 values, i.e. the preceding decoding result stored in the deinterleaving memory DIL2.

Only the switch SW1 is provided in this embodiment. The other elements of the Turbo-code decoder FECD100 are analogous to those of the Turbo-code decoder FECD1 of FIG. 4.

Figure 14:
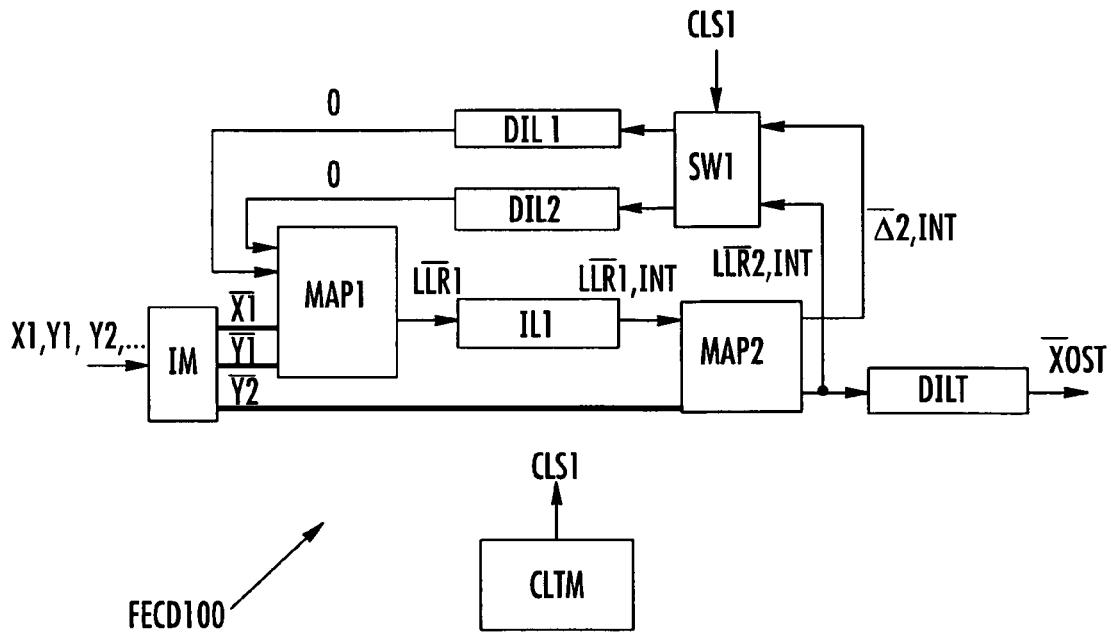
FIGS. 14 to 19 illustrate an example of turbo-code decoding according to the invention using the turbo-code decoder of FIG. 13.

In FIG. 14, $x_1$, $y_1$, and $y_2$ represent respectively the systematic values, the first parity values, and the second parity values of the first intermediate turbo-code encoded packet. For turbo-decoding the first encoded intermediate packet, the initial conditions are constituted by the systematic values $x_1$, the first and second parity values $y_1$ and $y_2$, the values "0" (FIG. 14) which represent the neutral values of the extrinsic information, as well as further values "0" that represent the neutral values of the LLR2 values. As a matter of fact, at the initial iteration, the input values from deinterleaver DIL1 and from deinterleaver DIL2 to the $MAP_1$ unit are set to "0".

Figure 15:
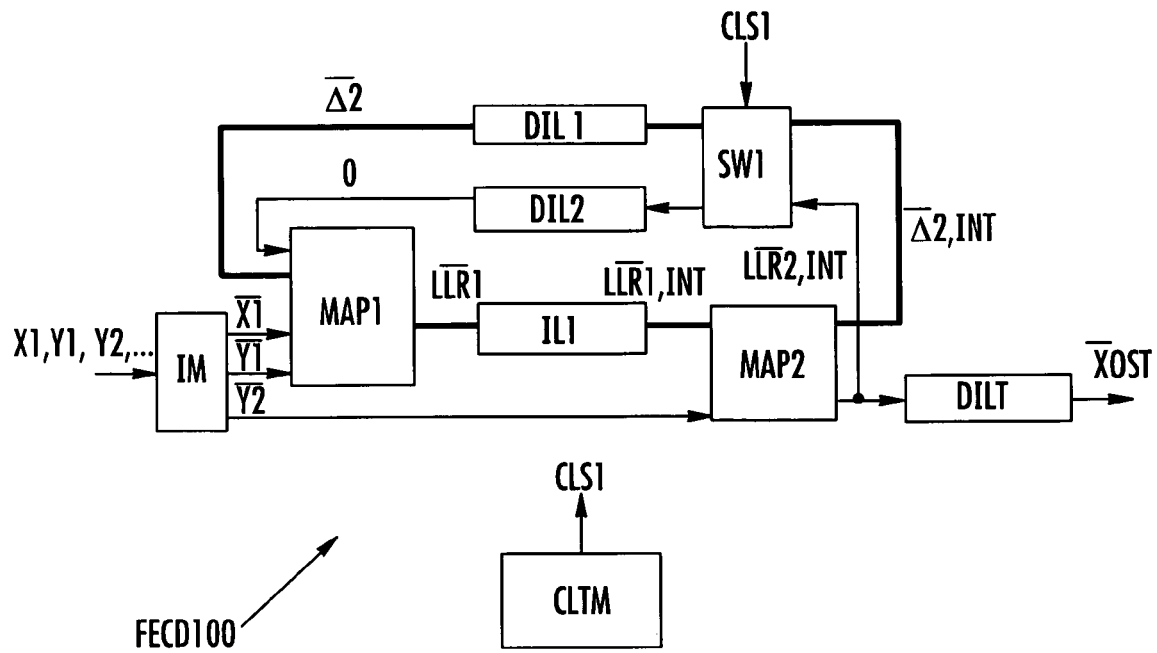

In the successive iterations of the turbo-decoding, the calculated extrinsic information $\Lambda_2$ is used at the input of the $MAP_1$ unit (FIG. 15). During these iterations, the switch SW1 is positioned so that the deinterleaving memory DIL1 is connected between the extrinsic output of the $MAP_2$ unit and the a priori input of the $MAP_1$, unit.

Further in these successive iterations of the turbo-decoding, the LLR2 values (having here the constant values "0") are continuously fed to the fourth input of the MAP1 unit. Metrics are calculated by the MAP1 unit by using for example formulas (1) above. However, in this preferred embodiment, d is given by formula (2'), instead of formula (2) above:

$$d = x_1 + \Lambda_2 + LLR2 \quad (2')$$

Figure 16:
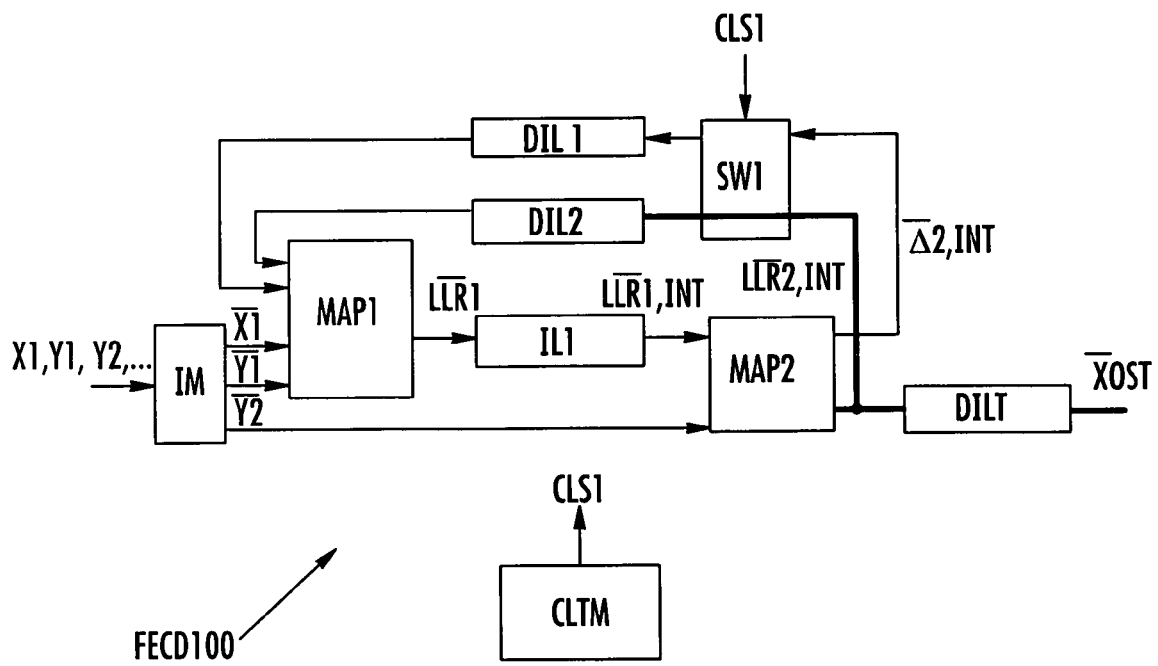

At the end of the last turbo decoding iteration, the LLR values $LLR_{2,int}$ are delivered to the output deinterleaver DILT for obtaining the output data stream $x_{est}$. Further, the controller or control means CLTM sends the control signal CLS1 so that these LLR values are also stored in the shadow memory DIL2 (FIG. 16).

If the received first intermediate encoded packet has not been considered as correctly decoded, a negative acknowledgment is sent to the transmitter by the receiver and the transmitter will send additional symbols to increase the coding performance. This might be a complete packet or incremental information segments, depending on the used ARQ scheme.

Figure 17:
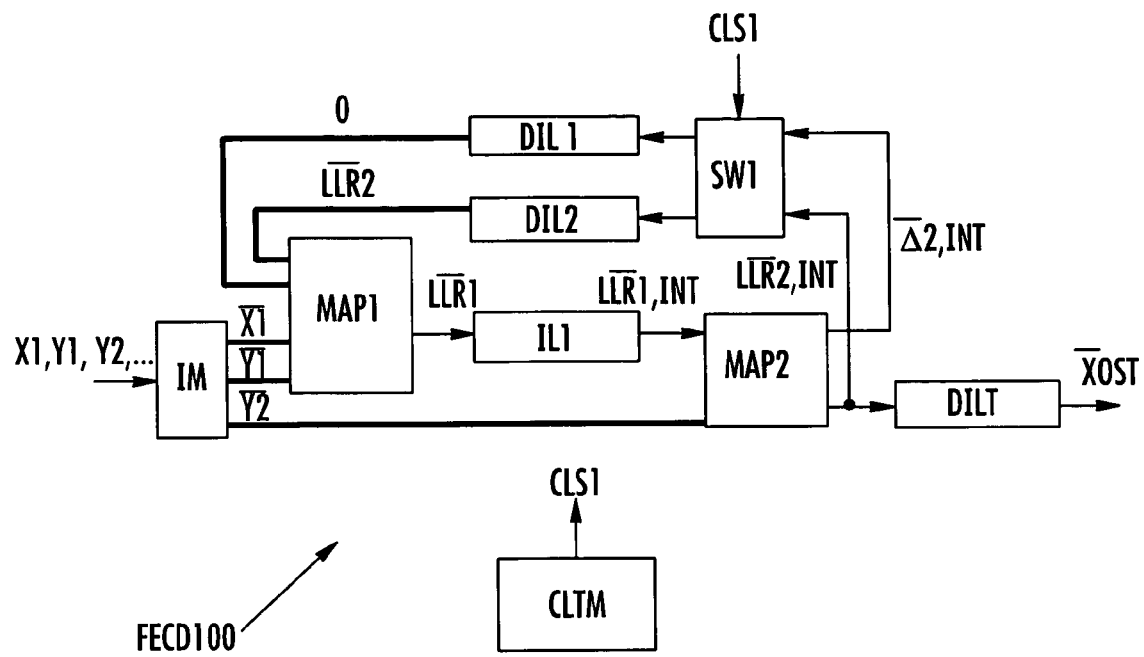

As illustrated in FIG. 17, assuming the first intermediate packet has not been correctly decoded, a second intermediate encoded packet is elaborated as described above for the first intermediate packet. In FIG. 17, $x_1$, $y_1$, and $y_2$ represent respectively the systematic values, the first parity values, and the second parity values of the second intermediate encoded packet.

Figure 18:
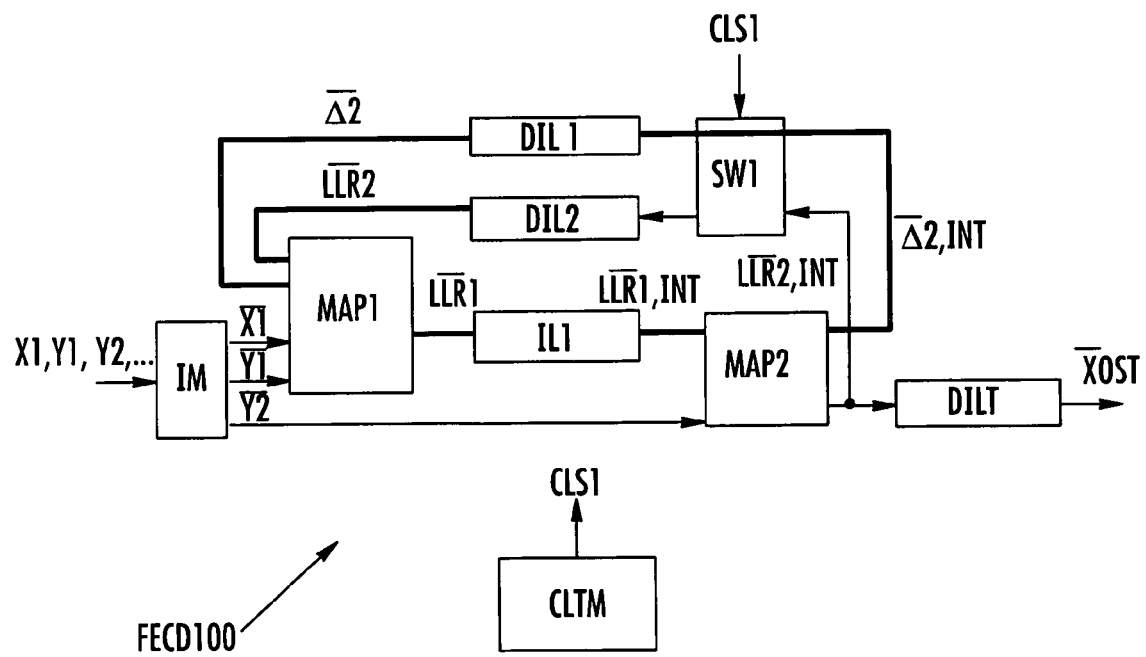

For the turbo decoding of this second intermediate encoded packet, the initial conditions are constituted by the values $x_1$, $y_1$, $y_2$, and by the LLR values $LLR_2$ stored in the shadow memory DIL2 and related to the decoding of the first intermediate packet, as well as by the neutral values of the extrinsic data $\Lambda_2$. The second intermediate packet is then turbo decoded as for the first intermediate packet (FIG. 18).

Figure 19:
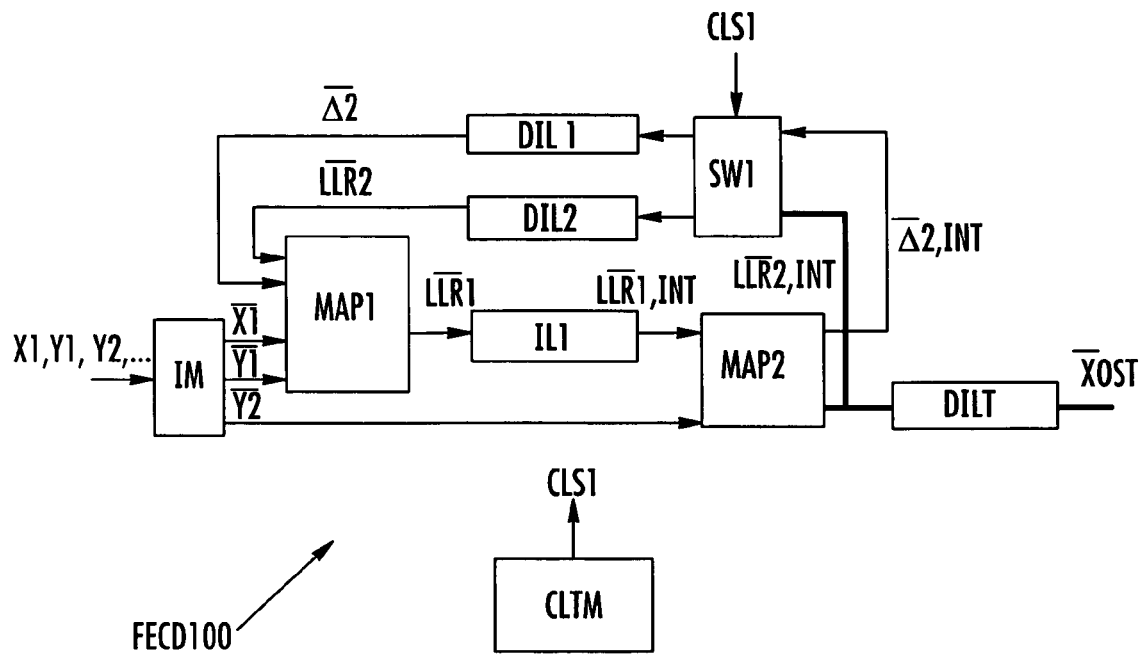

And, during all the iterations of this turbo decoding, the LLR2 values stored in the shadow memory DIL2 (having here constant values equal to the decoding result of the first intermediate packet) are continuously fed to the fourth input of the MAP1 unit. Thus this preceding decoding result is taken into account for initializing each ARQ iteration but also at each turbo-decoding iteration, improving thus the decoding precision while performing the combination previously performed outside of the decoder in the prior art. At the end of the last turbo decoding iteration, the LLR values (decoding results of the second intermediate packet) are stored in the shadow memory DIL2 in the eventuality of another ARQ iteration if the second intermediate packet has not been correctly decoded (FIG. 19).

Of course such an architecture can be extended in the case of several independent ARQ processes respectively associated for example to different users. As for the embodiment depicted in FIG. 11, for the case of several independent ARQ processes, the turbo-code decoder FECD100 comprises several independent deinterleaver LLR memories, and one deinterleaver memory DIL1 for the extrinsic information.

Another embodiment of the invention will now be described more particularly with reference to FIGS. 20 to 26. In this embodiment, the FEC code used is a Low-Density Parity-Check code (LDPC code).

Low-Density Parity-Check (LDPC) codes were introduced by Gallager in 1962 and rediscovered in 1996 by MacKay and Neal. LDPC codes are also described for example in US Patent Application No. 2003/0126551. For a long time they had no practical impact due to their computational and implementation complexity. This changed with advances in microelectronics that led to more computational power at hand for simulation and which now enables implementation. Due to their excellent error correction performance they are considered for future telecommunication standards.

A LDPC code is a linear block code defined by its sparse M×N parity check matrix H. It contains j ones per column and k ones per row, called row and column degree respectively. A (j,k)-regular LDPC code has row and column degree of uniform weight, otherwise the code is called irregular. A parity check code can be represented by a bipartite graph. The M check nodes correspond to the parity constraints, and the N variable nodes represent the data symbols of the codeword. An edge in the graph corresponds to a one in the parity check matrix.

In the LDPC code encoder, the packet to encode of size (N−M) is multiplied with a generator matrix G of size (N−M)×N. This multiplication leads to an encoded vector of length N. The generator matrix G and the parity check matrix H satisfy the relation $GH^t=0$ where 0 is the null matrix.

Figure 20:
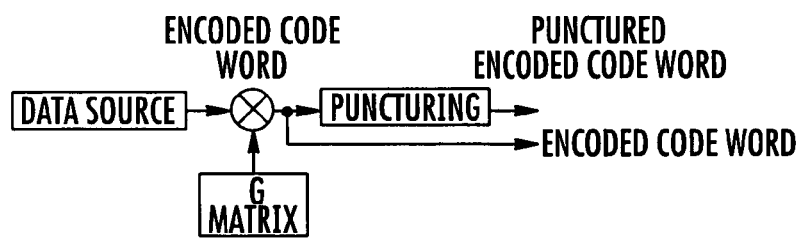
FIG. 20 illustrates diagrammatically an embodiment of a LDPC code encoder in accordance with the invention.

An example of such a structure of a LDPC code encoder FECC2 is illustrated in FIG. 20. If the encoder FECC2 is to be used in a hybrid ARQ system with incremental redundancy, the encoder is further provided with a puncturing unit that delivers a punctured encoded codeword as explained above for the turbo-code encoder.

In a hybrid ARQ system of type II without incremental redundancy, such puncturing unit may be used or not as explained above with reference to FIG. 2. But anyway, the same packet punctured (punctured encoded codeword) or not (encoded codeword) is retransmitted in the case of a negative acknowledgement.

Generally speaking an LDPC code decoder comprises a decoding module that receives the encoded vector of length N and delivers an intermediate vector of length N by using the parity check matrix H. Then a demapping module extracts from the intermediate vector the decoded vector of length (N−M).

Figure 21:
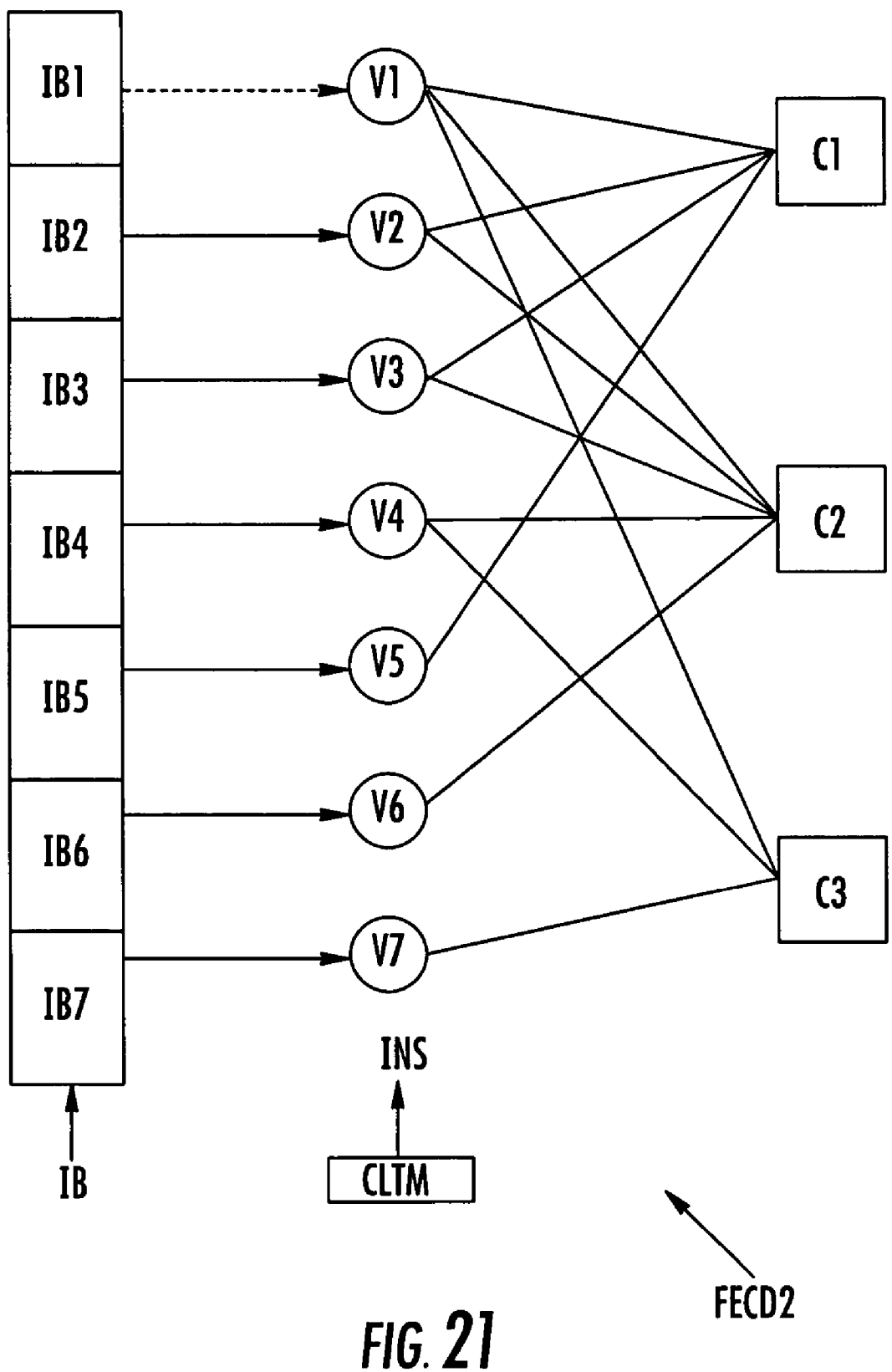
FIGS. 21 to 26 illustrate diagrammatically an embodiment of a LDPC code decoder according to the invention and an example of a combination step of a decoding method according to the invention applicable to a LDPC code decoding.

The basic structure of an LDPC code decoder based on message passing concept comprises variable nodes and check nodes. An example of such a structure is depicted in FIG. 21.

In this figure, the references V1 to V7 represent the variable nodes connected to the input buffer IB of the decoder, and the references C1 to C3 are the check nodes. In a real implementation, both variable and check nodes can be seen as processing units with dedicated memory elements.

More precisely LDPC codes can be decoded using message passing algorithms, either in hard or soft decision form. The decoding is then an iterative process, which exchanges messages between variable and check nodes. Typically a Belief Propagation (BP) algorithm can be used, which exchanges soft-information iteratively between variable and check nodes. The code performance mainly depends on the randomness of the parity check matrix, the codeword size N, and the code rate R=(N−M)/N.

Many publications describe LDPC decoders and the decoding algorithm implemented therein. An example of such a publication is "VLSI Implementation-Oriented (3,k)-Regular Low-Density Parity-Check Codes", Tong Zhang and Keshab K. Parhi, IEEE Workshop on Signal Processing Systems (SiPS), September 2001.

Further the LDPC code decoder FECD2 according to this embodiment of the invention comprises also a combination unit or combination means located in particular within the variable nodes. As it will be explained in more details hereafter, the combination unit or combination means will be used for elaborating the initial conditions of each ARQ iteration, and are controlled by control signal INS provided by controller or control means CLTM.

Each intermediate encoded packet, obtained in a manner analogous to the one described for the turbo-decoding implementation of the invention, is stored in the input buffer IB (in this example the LLR of each input softbit, because we work here in the log domain). The number N of variable nodes Vi is equal to the number of data (bit) of the intermediate packet which is stored in the input buffer IB of size N.

Figure 22:
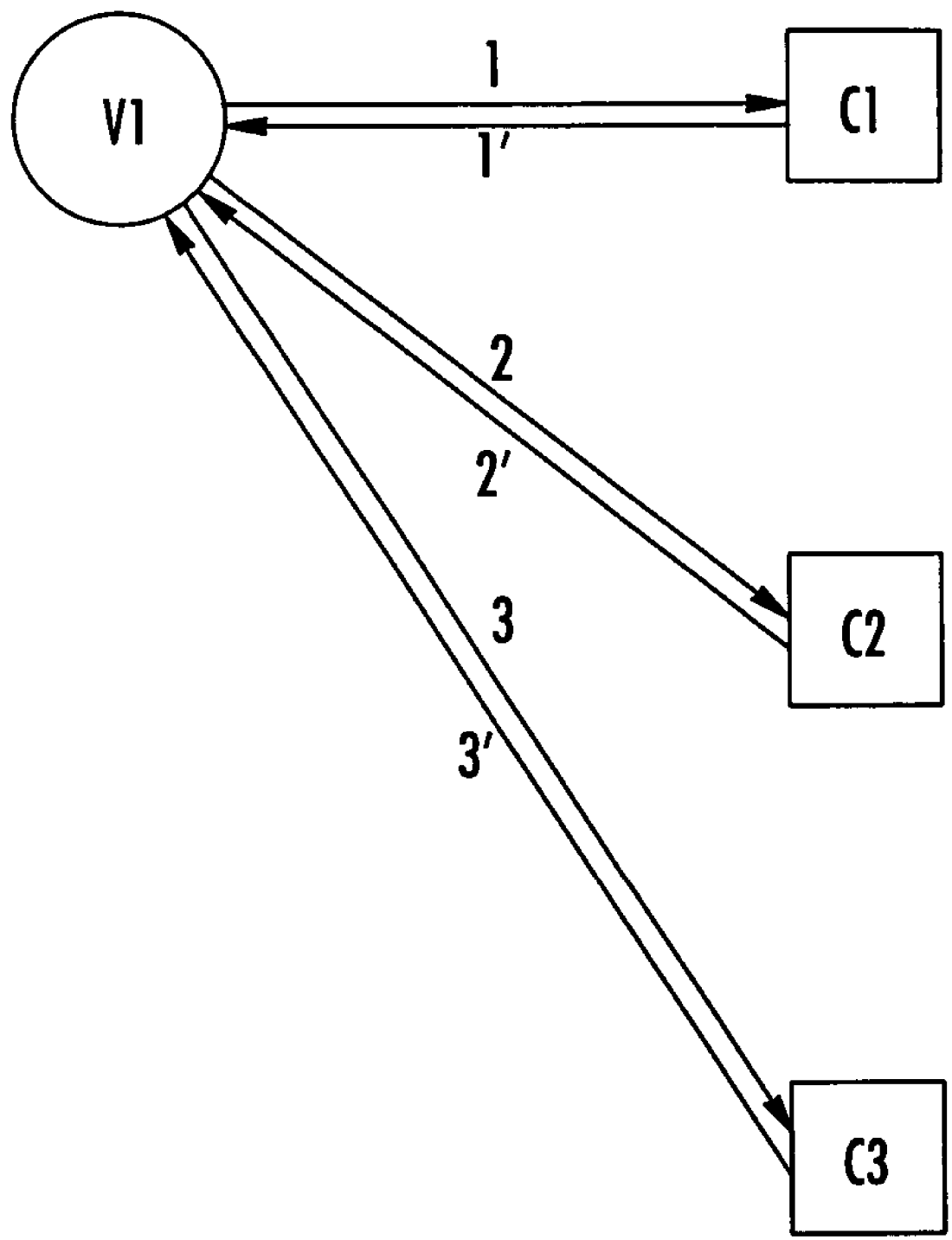

In FIG. 22, the connection between variable V1 and the check nodes C1-C3 is diagrammatically illustrated. More precisely, the variable node V1 sends a message to the check node Ci by a link i and receives message from the check node Ci by a link i'. The variable node V1 also receives the bit IB1 of the encoded intermediate packet stored in the input buffer IB.

Figure 23:
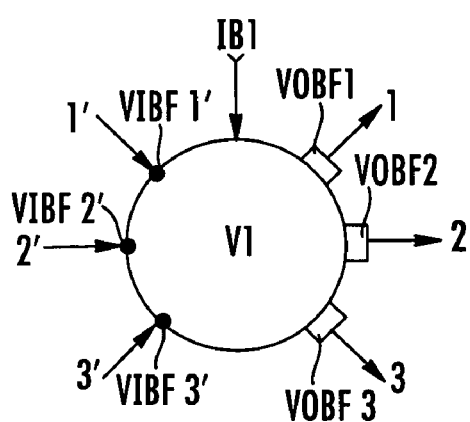
Figure 23:
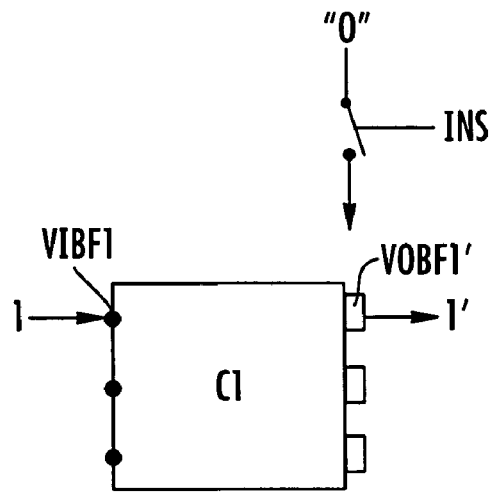
Figure 23:
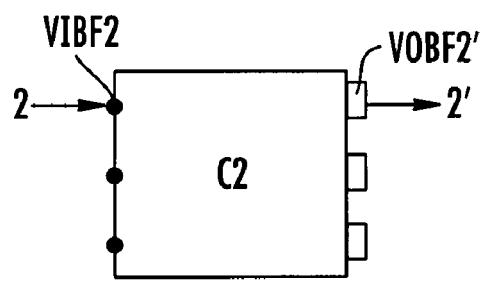
Figure 23:
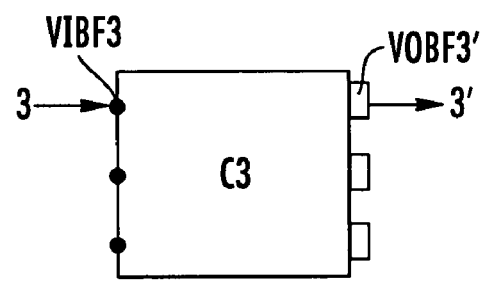

In fact as illustrated in FIG. 23, each check node comprises for example a first storage or first storing means including first elementary output buffers (for example in particular VOBF1', VOBF2', VOBF3' for check nodes C1, C2, C3 respectively) whereas each variable node comprises a second storage or second storing means including second elementary output buffers (for example in VOBF1, VOBF2, VOBF3). The second elementary output buffer VOBF1 is connected to the input VIBF1 of the check node C1 by the link 1.

The second elementary output buffer VOBF2 is connected to the input VIBF2 of the check node C2 by the link 2. The second elementary output buffer VOBF3 is connected to the input VIBF3 of the check node C3 by the link 3.

The first elementary output buffer VOBF1' is connected to the input VIBF1' of the variable node V1 by the link 1'. The first elementary output buffer VOBF2' is connected to the input VIBF2' of the variable node V1 by the link 2'. The first elementary output buffer VOBF3' is connected to the input VIBF3' of the variable node V1 by the link 3'.

Figure 24:
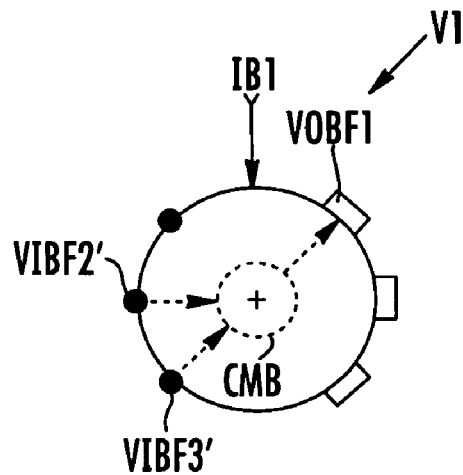
Figure 25:
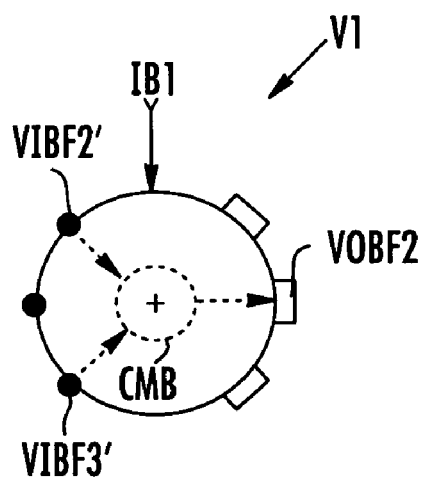
Figure 26:
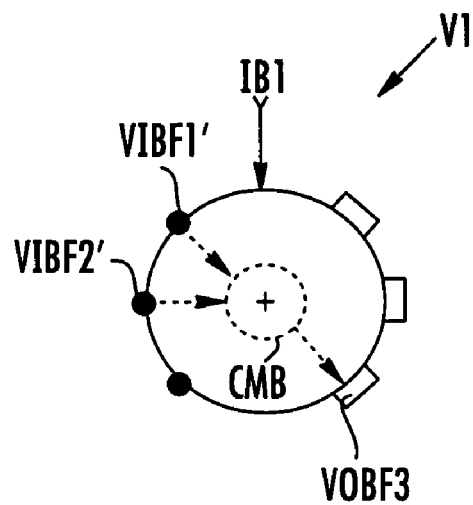

Further the processing unit of the variable node V1 comprises the combination unit or combination means CMB, including here an adder (in case the implementation is in the log domain), as illustrated in FIGS. 24-26. More precisely in this example the adder is adapted to combine the input IB1 with the value at the input VIBF2' (i.e. with the content of the elementary output buffer VOBF2'), and with the value at the input VIBF3' (i.e. with the content of the elementary output buffer VOBF3'), and to store the summation result in the elementary buffer VOBF1, as illustrated in FIG. 24.

The adder is further adapted to combine the input IB1 with the value at the input VIBF1' (i.e. with the content of the elementary output buffer VOBF1'), and with the value at the input VIBF3' (i.e. with the content of the elementary output buffer VOBF3'), and to store the summation result in the elementary buffer VOBF2, as illustrated in FIG. 25. The adder is further adapted to combine the input IB1 with the value at the input VIBF1' (i.e. with the content of the elementary output buffer VOBF1'), and with the value at the input VIBF2' (i.e. with the content of the elementary output buffer VOBF2'), and to store the summation result in the elementary buffer VOBF3, as illustrated in FIG. 26.

At the first ARQ iteration, i.e. for decoding the first elaborated intermediate packet, all the first elementary output buffers of all the check nodes have been reset to zero (neutral values) by the controller or control means (signal INS) as illustrated diagrammatically on the top of FIG. 23. The content of the input buffer IB is added to the content of these first elementary output buffers (i.e. yet neutral values) according to combination schemes of the type illustrated in FIGS. 24-26, and stored in corresponding second elementary output buffers of the variable nodes.

In other words, the initial conditions are the N values of the first intermediate encoded packet stored in the input buffer IB.

Then, the LDPC decoding of the first intermediate packet can be processed by exchanging messages between the variables nodes and the check nodes, the corresponding adders of the variable nodes also performing summations according to summation schemes of the type illustrated in FIGS. 24-26.

The decoding results of this LDPC decoding are constituted with values that are stored in the first elementary output buffers of the check nodes Ci. If the first intermediate packet has been considered as being not correctly decoded, a negative acknowledgement is sent back to the transmitter that sends then additional information (either the same packet in an hybrid ARQ system of type II, or additional information in case of incremental redundancy).

Then, a second intermediate packet is elaborated, as described above (steps 26, 20, 21, 23 of FIG. 2). However, instead of resetting the first elementary output buffers of the check nodes to "zero", as in the prior art, the N respective values of the second intermediate packet, respectively stored in the input buffer IB, are combined with the corresponding values contained in these first elementary output buffers of the check nodes Ci, in accordance with the connection scheme between the check nodes and the variable nodes.

In other words, the decoding result of the preceding decoding iteration is combined with the current intermediate packet. Then, the LDPC decoding of the second intermediate packet is performed by again exchanging messages between the variable nodes and the check nodes.

Thus, according to this embodiment of the invention, the LDPC decoder internal memory elements are used to store the intermediate decoding results for the use in the combination process. Instead of discarding the intermediate results and storing the original received soft values, theses results can be used in the consecutive decoding process. Of course, when an intermediate packet has been considered to be correctly decoded (step 27 FIG. 2), the elementary output buffers of the check nodes are reset to "zero" for the decoding of another incident encoded packet.

It is to be noted that the aforementioned description only serves as an illustrative example of how to map the current invention in an LDPC case. Other ways of implementing such a decoder, for instance not in the log domain, or using other message passing algorithms (e.g. simplified BP), do not prevent its application. Only the details of implementation would be adapted, for instance by replacing adders by multipliers, or by different processing units in the nodes.

That which is claimed is:

1. A method of decoding an incident Forward Error Correction (FEC) code encoded packet of data within an Automatic Repeat Request (ARQ) scheme, the method comprising:
    executing successive decoding processes of successive intermediate FEC code encoded packets related to the incident FEC code encoded packet of data by a processor, each decoding process including a FEC code decoding process, and where a current decoding process includes determining initial decoding conditions from a FEC code decoding result concerning a preceding intermediate FEC code encoded packet and from a current intermediate FEC code encoded packet; and
    performing a current FEC code decoding process by the processor using the initial decoding conditions.

2. The method according to claim 1 wherein each intermediate FEC code encoded packet comprises a received encoded group of data resulting from a transmission of a punctured FEC code encoded packet obtained from a puncturing of the incident FEC code encoded packet, and additional reference data.

3. The method according to claim 1 wherein each intermediate FEC code encoded packet comprises a received packet resulting from a transmission of a totality of the incident FEC code encoded packet.

4. The method according to claim 1 wherein each FEC code decoding comprises a Soft-In-Soft-Out decoding process, and each FEC code decoding result comprises soft output values.

5. The method according to claim 4 wherein the incident FEC code encoded packet comprises an incident Turbo code encoded packet and each FEC code decoding comprises a Turbo code decoding process.

6. The method according to claim 5 wherein each Turbo code decoding process comprises an iterative Soft-In-Soft-Out decoding process for delivering Log-Likelihood-Ratios (LLRs), and the initial decoding conditions comprises data of the current intermediate FEC code encoded packet and previous LLRs delivered at an end of the Turbo code decoding process concerning the preceding intermediate FEC code encoded packet.

7. The method according to claim 6 wherein the iterative Soft-In-Soft-Out decoding process comprises two decoding processes of a Maximum-A-Posteriori (MAP) type, and the data of the current intermediate FEC code encoded packet comprise systematic values, first parity values, and second parity values, and the initial decoding conditions comprises first data delivered to a first MAP decoding process, the first data including the systematic values, the first parity values and the previous LLRs, and second data delivered to a second MAP decoding process, the second data including second parity values.

8. The method according to claim 7 wherein a Turbo-code decoding result concerning a preceding intermediate Turbo-code encoded packet is further taken into account at each iteration of a current iterative Turbo-code decoding process.

9. The method according to claim 8 wherein the previous LLRs are delivered to a first MAP decoding process at each iteration of a current iterative Turbo-code decoding process.

10. The method according to claim 4 wherein the incident FEC code encoded packet comprises an incident Low Density Parity Check (LDPC) encoded packet and each FEC decoding comprises an LDPC decoding process.

11. The method according to claim 10 wherein the LDPC decoding process comprises iterative exchanges of values between check nodes including processing units and a first storage, and variable nodes including processing units and second storage, the first storage containing a decoding result of the LDPC decoding process, and a determining step of the initial decoding conditions comprises combining within the variable nodes data of a current intermediate LDPC encoded packet with a decoding result concerning a preceding intermediate LDPC encoded packet and contained in the first storage, and storing the initial decoding conditions in the second storage.

12. The method according to claim 11 wherein a combination of data of the current intermediate LDPC encoded packet with the decoding result concerning the preceding intermediate LDPC encoded packet comprises a summation.

13. A device for decoding an incident FEC code encoded packet of data within an ARQ scheme, the device comprising:
    a processor for performing successive decoding processes of successive intermediate FEC code encoded packets related to the incident FEC code encoded packet of data;
    said processor including a FEC decoder comprising a determination unit for determining initial decoding conditions from a FEC code decoding result concerning a preceding intermediate FEC code encoded packet and from a current intermediate FEC code encoded packet, and the FEC decoder for performing the current FEC code decoding using the initial decoding conditions.

14. The device according to claim 13 wherein each intermediate FEC code encoded packet comprises a received packet resulting from a transmission of the totality of the incident FEC code encoded packet.

15. The device according to claim 13 wherein each intermediate FEC code encoded packet comprises a received encoded group of data resulting from a transmission of a punctured FEC code encoded packet obtained from a puncturing of the incident FEC code encoded packet of data, and additional reference data.

16. The device according to claim 13 wherein the FEC decoder comprises a Soft-In-Soft-Out decoder for delivering a decoding result comprising soft output values.

17. The device according to claim 16 wherein the incident FEC code encoded packet comprises an incident Turbo code encoded packet and the FEC decoder comprises a Turbo code decoder.

18. The device according to claim 17 wherein the Turbo code decoder is for performing an iterative Soft-In-Soft-Out decoding process for delivering LLRs, and the initial decoding conditions comprise data of the current intermediate FEC code encoded packet and previous LLRs delivered by the Turbo code decoder at an end of a Turbo code decoding process concerning the preceding intermediate FEC code encoded packet.

19. The device according to claim 18 wherein the Turbo code decoder comprises at least one MAP unit for implementing two decoding processes of a MAP type, and the current intermediate FEC code encoded packet comprises systematic values, first parity values, and second parity values, and the initial decoding conditions comprise first data delivered to a first MAP decoding process, the first data including the systematic values, the first parity values, and the previous LLRs, and second data delivered to a second MAP decoding process, the second data including second parity values.

20. The device according to claim 19 wherein the Turbo code decoder further comprises:
a main deinterleaving memory for storing and deinterleaving extrinsic information delivered by the second MAP decoding process;
an auxiliary deinterleaving memory for storing and deinterleaving the previous LLRs;
a first switch for delivering either the extrinsic information to the main deinterleaving memory or the previous LLRs to the auxiliary deinterleaving memory;
a second switch for delivering either the deinterleaved extrinsic information or the deinterleaved previous LLRs to the first MAP decoding process; and
a controller for controlling the first and second switches.

21. The device according to claim 20 wherein previous LLRs are delivered to the first MAP decoding process at each iteration of current the iterative Turbo-code decoding process.

22. The device according to claim 21 wherein the Turbo code decoder further comprises:
a main deinterleaving memory for storing and deinterleaving extrinsic information delivered by the second MAP decoding process, an output of the main deinterleaving memory connected to the an a priori input of the first MAP decoding process;
an auxiliary deinterleaving memory for storing and deinterleaving the previous LLRs, an output of the auxiliary deinterleaving memory connected to a fourth input of the first MAP decoding process;

a first switch for delivering either the extrinsic information to the main deinterleaving memory or the previous LLRs to the auxiliary deinterleaving memory; and
a controller for controlling the first switch.

23. The device according to claim 22 wherein the Turbo code decoder further comprises several auxiliary deinterleaving memories, respectively for storing several previous LLRs respectively associated to several different independent ARQ schemes.

24. The device according to claim 16 wherein the incident FEC code encoded packet comprises an incident LDPC encoded packet and the FEC decoder comprises a LDPC decoder.

25. The device according to claim 24 wherein the LDPC decoder comprises check nodes including check node processing units and a first storage, and variable nodes including variable node processing units and a second storage, the first storage for containing a decoding result of a LDPC decoding process, and the determination unit comprises a combination unit including the variable nodes for combining data of a current intermediate LDPC encoded packet with a decoding result concerning a preceding intermediate LDPC encoded packet, and storing the initial decoding conditions in the second storage of the variable nodes.

26. The device according to claim 25 wherein the combination unit comprises a summation unit.

27. The device according to claim 13 wherein the ARQ scheme comprises a Hybrid ARQ system.

28. The device according to claim 13 further comprising a wireless transceiver cooperating with said processor.

29. The device according to claim 13 further comprising a wireline transceiver cooperating with said processor.

30. A device for decoding an incident FEC code encoded packet of data within an ARQ scheme, the device comprising:
a processor for performing successive decoding processes of successive intermediate FEC code encoded packets related to the incident FEC code encoded packet of data;
said processor including a FEC decoder comprising a Soft-In-Soft-Out decoder and a determination unit for determining initial decoding conditions from a FEC code decoding result concerning a preceding intermediate FEC code encoded packet and from a current intermediate FEC code encoded packet, each intermediate FEC code encoded packet including a received packet resulting from a transmission of the totality of the incident FEC code encoded packet, and the FEC decoder for performing the current FEC code decoding using the initial decoding conditions.

31. The device according to claim 30 wherein each intermediate FEC code encoded packet comprises a received encoded group of data resulting from a transmission of a punctured FEC code encoded packet obtained from a puncturing of the incident FEC code encoded packet of data, and additional reference data.

32. The device according to claim 30 wherein the incident FEC code encoded packet comprises an incident Turbo code encoded packet and the FEC decoder comprises a Turbo code decoder.

33. The device according to claim 32 wherein the Turbo code decoder is for performing an iterative Soft-In-Soft-Out decoding process for delivering LLRs, and the initial decoding conditions comprise data of the current intermediate FEC code encoded packet and previous LLRs delivered by the Turbo code decoder at an end of a Turbo code decoding process concerning the preceding intermediate FEC code encoded packet.

34. The device according to claim 30 wherein the incident FEC code encoded packet comprises an incident LDPC encoded packet and the FEC decoder comprises a LDPC decoder.

35. The device according to claim 34 wherein the LDPC decoder comprises check nodes including check node processing units and a first storage, and variable nodes including variable node processing units and a second storage, the first storage for containing a decoding result of a LDPC decoding process, and the determination unit comprises a combination unit including the variable nodes for combining data of a current intermediate LDPC encoded packet with a decoding result concerning a preceding intermediate LDPC encoded packet, and storing the initial decoding conditions in the second storage of the variable nodes.

\* \* \* \* \*

UNITED STATES PATENT AND TRADEMARK OFFICE
CERTIFICATE OF CORRECTION

PATENT NO. : 7,600,172 B2  Page 1 of 1
APPLICATION NO. : 11/293460
DATED : October 6, 2009
INVENTOR(S) : Berens et al.

It is certified that error appears in the above-identified patent and that said Letters Patent is hereby corrected as shown below:

| | |
|---|---|
| Front Page, ABSTRACT | Delete: "included" Insert: --includes-- |
| Column 2, Line 42 | Delete: "an" Insert: --a-- |
| Column 3, Line 65 | Delete: "it is" |
| Column 3, Line 66 | Delete: "proposed a" Insert: --proposed is a-- |
| Column 8, Line 51 | Delete: "$X_{est}$" Insert: --$x_{est}$-- |
| Column 8, Line 61 | Delete: "of" |
| Column 15, Line 2 | Delete: "variables" Insert: --variable-- |

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,600,172 B2  Page 1 of 1
APPLICATION NO. : 11/293460
DATED : October 6, 2009
INVENTOR(S) : Berens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Fifth Day of October, 2010

David J. Kappos
*Director of the United States Patent and Trademark Office*